US008423529B1

(12) United States Patent
Bloomstein et al.

(10) Patent No.: US 8,423,529 B1
(45) Date of Patent: Apr. 16, 2013

(54) SYSTEM, DEVICE, AND METHOD FOR RUNNING THIRD-PARTY DATA PROCESSING APPLICATIONS VIRTUALIZED ON A NAS SERVER

(75) Inventors: Jason R. Bloomstein, Mountain View, CA (US); Carlo F. Garbagnati, San Jose, CA (US); Peter R. Falk, Sunnyvale, CA (US); Shmuel Shottan, Sunnyvale, CA (US)

(73) Assignee: BlueArc UK Limited, Bracknell, Berkshire (GB)

( * ) Notice: Subject to any disclaimer, the term of this patent is extended or adjusted under 35 U.S.C. 154(b) by 0 days.

(21) Appl. No.: 13/198,877

(22) Filed: Aug. 5, 2011

Related U.S. Application Data

(60) Provisional application No. 61/370,951, filed on Aug. 5, 2010.

(51) Int. Cl.
*G06F 17/30* (2006.01)
(52) U.S. Cl.
USPC .......................................................... 707/706

(58) Field of Classification Search .................. 707/2, 3, 707/706; 718/1, 102; 711/162
See application file for complete search history.

(56) References Cited

U.S. PATENT DOCUMENTS

| 8,209,506 B2 * | 6/2012 | Yueh ............................. 711/162 |
| 2007/0044100 A1 * | 2/2007 | Panesar et al. ................ 718/102 |
| 2010/0175064 A1 * | 7/2010 | Brahmaroutu .................... 718/1 |

* cited by examiner

*Primary Examiner* — Etienne Leroux
(74) *Attorney, Agent, or Firm* — Sunstein Kann Murphy & Timbers LLP

(57) ABSTRACT

A NAS server runs a native filesystem application that manages the filesystem and also includes a virtualization component that allows third-party data processing applications to run on the NAS server substantially as though running on a separate server while allowing the applications to access filesystem information without use of the network and without the overhead of network protocols and related operating system processing. The virtualization component intercepts certain filesystem-related system calls made by the application and directs processing of those filesystem-related system calls (e.g., by the virtualization component or by the native filesystem application), bypassing certain operating system processes including those relating to network protocol processing.

30 Claims, 30 Drawing Sheets

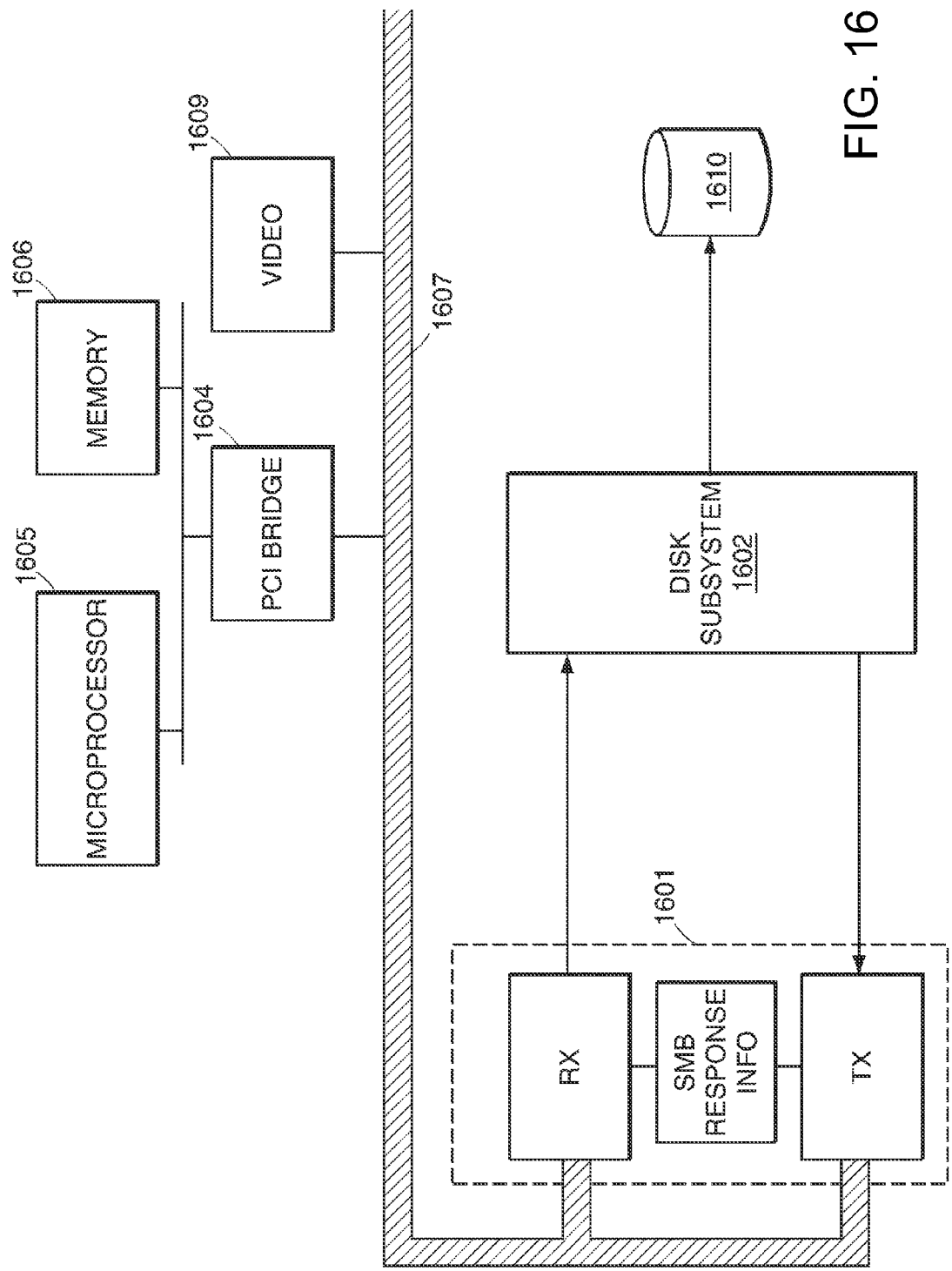

SYSTEM, DEVICE, AND METHOD FOR RUNNING THIRD-PARTY DATA PROCESSING APPLICATIONS VIRTUALIZED ON A NAS SERVER

CROSS-REFERENCE TO RELATED APPLICATION(S)

This patent application claims the benefit of U.S. Provisional Patent Application No. 61/370,951 entitled SYSTEM, DEVICE, AND METHOD FOR RUNNING THIRD-PARTY DATA PROCESSING APPLICATIONS VIRTUALIZED ON A NAS SERVER filed on Aug. 5, 2010.

The subject matter of this application may be related to the subject matter of U.S. patent application Ser. No. 12/535,402 filed Aug. 4, 2009 (United States Publication No. 2009/0292850), which is a divisional of U.S. patent application Ser. No. 10/889,158 filed Jul. 12, 2004 (United States Publication No. 2005/0021764), which is a continuation of U.S. patent application Ser. No. 09/879,798 filed Jun. 12, 2001 (now U.S. Pat. No. 6,826,615), which is a continuation-in-part of U.S. patent application Ser. No. 09/418,558 filed Oct. 14, 1999 (currently abandoned).

Each of the above-referenced patent applications and publications is hereby incorporated herein by reference in its entirety.

TECHNICAL FIELD

The present invention relates to operating system functions and hardware implementation or acceleration of such functions.

BACKGROUND ART

Operating systems in computers enable the computers to communicate with external resources. The operating system typically handles direct control of items associated with computer usage including keyboard, display, disk storage, network facilities, printers, modems, etc. The operating system in a computer is typically designed to cause the central processing unit ("CPU") to perform tasks including the managing of local and network file systems, memory, peripheral device drivers, and processes including application processes. Placing responsibility for all of these functions on the CPU imposes significant processing burdens on it, particularly when the operating system is sophisticated, as, for example, in the case of Windows NT (available from Microsoft Corporation, Redmond, Wash.), Unix (available from many sources, including from SCO Software, Santa Cruz, Calif., and, in a version called "Linux" from Red Hat Software, Cambridge, Mass.), and NetWare (available from Novell, Provo, Utah). The more the burden is placed on the CPU to run processes other than those associated with applications, the less CPU time is available to run applications with the result that performance of the applications may be degraded. In addition, the throughput of devices external to the CPU is subject to the limitations imposed by the CPU when the operating system places responsibility for managing these devices on the CPU. Furthermore, reliability of the overall software-hardware system, including the CPU, running the operating system, in association with the devices, will depend, among other things, on the operating system. Owing to the inherent complexity of the operating system, unforeseen conditions may arise which may undermine stability of the overall software-hardware system.

SUMMARY OF EXEMPLARY EMBODIMENTS

In exemplary embodiments of the present invention, a NAS server runs a native filesystem application that manages the filesystem and also includes a virtualization component that allows third-party data processing applications (e.g., an archiving application, a deduplication application, or a file migration application) to run on the NAS server substantially as though running on a separate server while allowing the applications to access filesystem information without use of the network and without the overhead of network protocols and related operating system processing. The virtualization component intercepts certain filesystem-related system calls made by the application and directs processing of those filesystem-related system calls (e.g., by the virtualization component or by the native filesystem application), bypassing certain operating system processes including those relating to network protocol processing.

In accordance with one aspect of the invention there is provided a server for network-attached storage, the server including a filesystem module configured to service a set of filesystem-related requests and a processor programmed to run an operating system, a virtualization component, a native filesystem application, a virtualized third-party data processing application, and a filesystem module interface, wherein the virtualization component is programmed to intercept a predetermined set of filesystem-related system calls from the third-party data processing application and to direct servicing of such intercepted filesystem-related system calls by the filesystem module via the filesystem module interface.

In accordance with another aspect of the invention there is provided a method network-attached storage, the network-attached storage including a server having a filesystem module configured to service a set of filesystem-related requests and processor programmed to run an operating system, a virtualization component, a native filesystem application, a virtualized third-party data processing application, and a filesystem module interface. The method includes intercepting, by the virtualization component, a predetermined set of filesystem-related system calls from the third-party data processing application; and directing, by the virtualization component, servicing of such intercepted filesystem-related system calls by the filesystem module via the filesystem module interface.

In various alternative embodiments, the filesystem module may be implemented in hardware separate from the processor. For example, the filesystem module may include a set of registers through which the set of filesystem-related requests are provided to the filesystem module, and wherein the filesystem module interface may provide access to the registers by other software components running on the processor. The filesystem module interface may be integral with the native filesystem application. The filesystem module interface may provide an application program interface through which the virtualization component interfaces with the filesystem module. The virtualization component may include a driver that is integrated with the operating system. Embodiments may include a network interface module implemented in hardware separate from the processor and the filesystem module.

Additionally or alternatively, the third-party data processing application may be configured to run on a separate server and use network protocols to communicate with a filesystem over a network, in which case the servicing of intercepted filesystem-related system calls may bypass operating system processes related to network protocol processing, and the virtualization component may allow the third-party data processing application to run regardless of the status of the network. The third-party data processing application may be configured to mount a local filesystem volume as a remote volume, in which case volume-related systems calls that are intercepted by the virtualization component may bypass protocol processing that would normally be involved with directing the system calls to a remote volume.

Furthermore, the virtualization component may be configured to service at least one filesystem-related system call that is not supported by the operating system. The virtualization component may be configured to direct at least one intercepted filesystem-related system call to the native filesystem application for processing, in which case the native filesystem application may selectively interface with the filesystem module via the filesystem module interface to satisfy the intercepted filesystem-related system call.

In some cases, the third-party data processing application may be configured to access the filesystem module directly via the filesystem module interface for at least one filesystem-related operation, such as, for example, preloading directories, pre-fetching user data, or storing application-related information in the filesystem. The filesystem module may be configured to perform at least one filesystem module function based on application-related information stored in the filesystem by the third-party data processing application. Additional embodiments may be disclosed and claimed.

BRIEF DESCRIPTION OF THE DRAWINGS

The foregoing features of the invention will be more readily understood by reference to the following detailed description, taken with reference to the accompanying drawings, in which:

FIG. 16 is a block diagram illustrating use of a file system module, such as illustrated in FIG. 3, in connection with a computer system having file storage;

DETAILED DESCRIPTION OF SPECIFIC EMBODIMENTS

Figure 1:
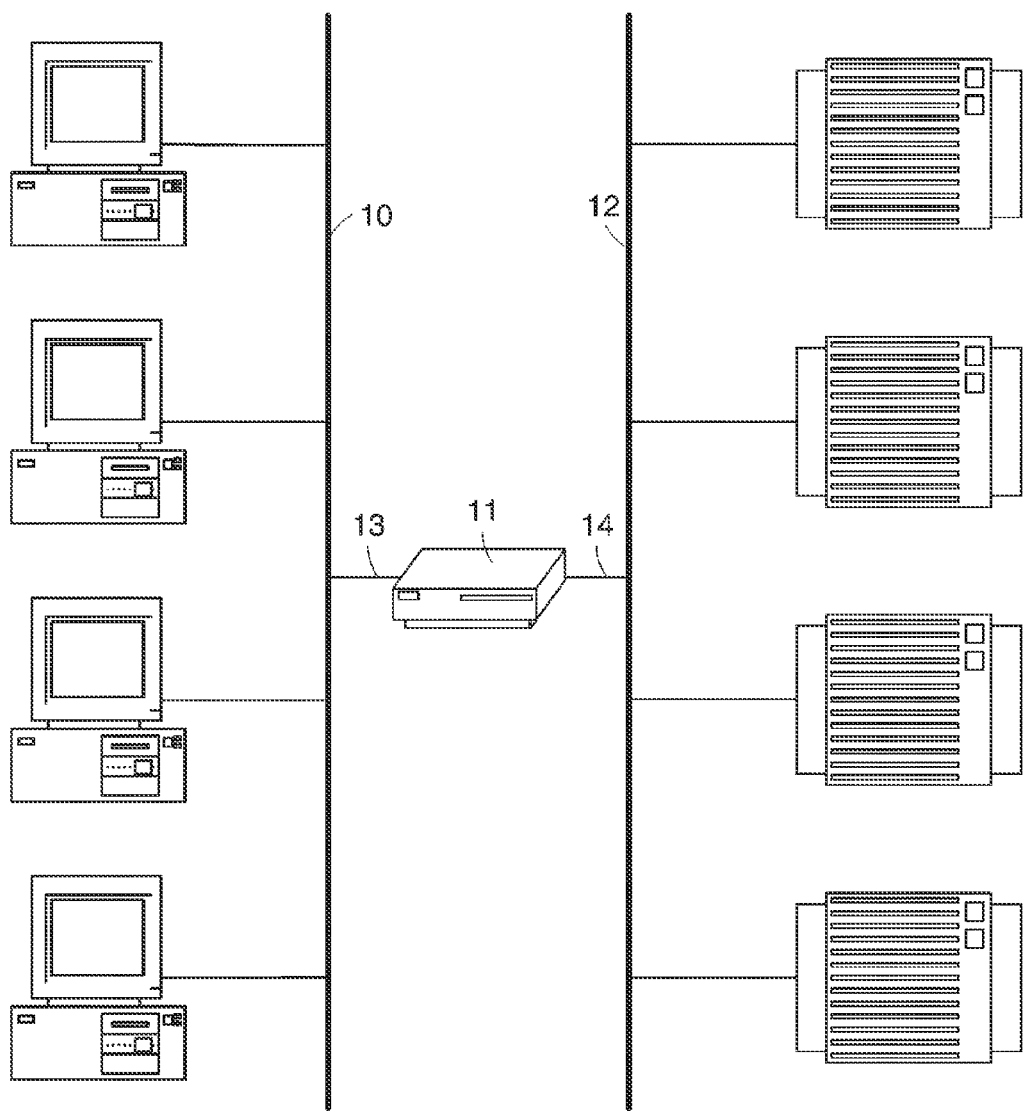
FIG. 1 is a schematic representation of an embodiment of the present invention configured to provide network services, such as a file server or a web server.

For the purpose of the present description and the accompanying claims, the following terms shall have the indicated meanings unless the context otherwise requires:

A "hardware-implemented subsystem" means a subsystem wherein major subsystem functions are performed in dedicated hardware that operates outside the immediate control of a software program. Note that such a subsystem may interact with a processor that is under software control, but the subsystem itself is not immediately controlled by software. "Major" functions are the ones most frequently used.

A "hardware-accelerated subsystem" means one wherein major subsystem functions are carried out using a dedicated processor and dedicated memory, and, additionally (or alternatively), special purpose hardware; that is, the dedicated processor and memory are distinct from any central processor unit (CPU) and memory associated with the CPU.

"TCP/IP" are the protocols defined, among other places, on the web site of the Internet Engineering Task Force, at www.ietf.org, which is hereby incorporated herein by reference. "IP" is the Internet Protocol, defined at the same location.

A "file" is a logical association of data.

A protocol "header" is information in a format specified by the protocol for transport of data associated with the user of the protocol.

A "SCSI-related" protocol includes SCSI, SCSI-2, SCSI-3, Wide SCSI, Fast SCSI, Fast Wide SCSI, Ultra SCSI, Ultra2 SCSI, Wide Ultra2 SCSI, or any similar or successor protocol. SCSI refers to "Small Computer System Interface," which is a standard for parallel connection of computer peripherals in accordance with the American National Standards Institute (ANSI), having a web URL address at www.ansi.org.

Reference to "layers 3 and 4" means layers 3 and 4 in the Open System Interconnection ("OSI") seven-layer model, which is an ISO standard. The ISO (International Organization for Standardization) has a web URL address at www.iso.ch.

A "filesystem-related system call" is a operating system call relating to the filesystem. Example LINUX™ filesystem-related system calls include mount, unmount, create, open, close, read, and write, to name but a few. Other operating systems have similar types of filesystem-related system calls.

A "network-attached storage server" or "NAS server" is a file server that manages one or more filesystems in associated data storage devices and provides access to the filesystem(s) over a network using a network protocol such as NFS, CIFS, NDMP, etc.

A "native filesystem application" is a filesystem application written specifically for a particular NAS server, typically by or for the manufacturer of the NAS server. A native filesystem application typically uses proprietary data structures and protocols for managing a filesystem.

A "third-party data processing application" (also referred to herein for convenience as a "3P application") is a data processing application that is typically designed to run on a server separate from the NAS server. A 3P application typically interfaces with one or more filesystems managed by the NAS server using standard network protocols such as NFS, CIFS, NDMP, etc. Exemplary 3P applications may include such things as file migration applications, file archiving applications, file backup applications, file deduplication applications, database applications, web server applications, and email server applications, to name but a few. The present invention is not limited to any particular type of 3P application.

In embodiments of the present invention, a NAS server runs a native filesystem application that manages the filesystem and also includes a virtualization component that allows 3P applications to run on the NAS server substantially as though running on a separate server while allowing the 3P applications to access filesystem information without use of the network and without the overhead of network protocols and related operating system processing. Specifically, virtualization component essentially intercepts certain filesystem-related system calls made by the 3P application and directs processing of those filesystem-related system calls (e.g., by the virtualization component or by the native filesystem application), bypassing certain operating system processes including those relating to network protocol processing.

Typically, the virtualization component provides sufficient processing of the filesystem-related system calls such that the 3P application can be run on the NAS server with little or no modifications. In such a virtualized environment, the 3P application is generally not "aware" that it is running locally with the native filesystem application. It may, for example, mount a volume as a remote volume in the same manner that it would mount the volume when running on a separate server. System calls relating to the volume, however, are intercepted by the virtualization component and directed to the native filesystem application, bypassing the protocol processing that would normally be involved with directing the system call to a remote volume.

Alternatively or additionally, the virtualization component may provide enhanced system call functionality (e.g., supporting additional parameters and/or options) and/or additional functionality not supported by the operating system itself (e.g., calls that allow the 3P application to access custom filesystem information or perform filesystem functions not available through the network protocols). Thus, for example, the virtualization component may provide an Application Program Interface (API) through which the 3P application can access the filesystem. The 3P application vendor may modify the 3P application to utilize such enhancements.

In addition to saving hardware resources by running multiple applications in the NAS server, embodiments of the present invention are expected to provide substantial performance increases for the 3P application by providing essentially a direct path to the filesystem without the overhead of the network and network protocol processing, and also are expected to provide substantial performance increases for other applications running over the network by offloading the 3P application traffic from the network and customizing data access based on 3P application objectives. Prototypes running a 3P archiving application on a BlueArc MERCURY™ NAS server running a Linux operating system showed performance increases of 500-3000% compared to the same application running in a separate server communicating with the NAS server over a network. Additional advantages include the ability for the 3P application to run even if the network is down (e.g., providing high availability) and the ability for 3P vendors and customers to run their own applications virtualized on the NAS server.

Figure 24:
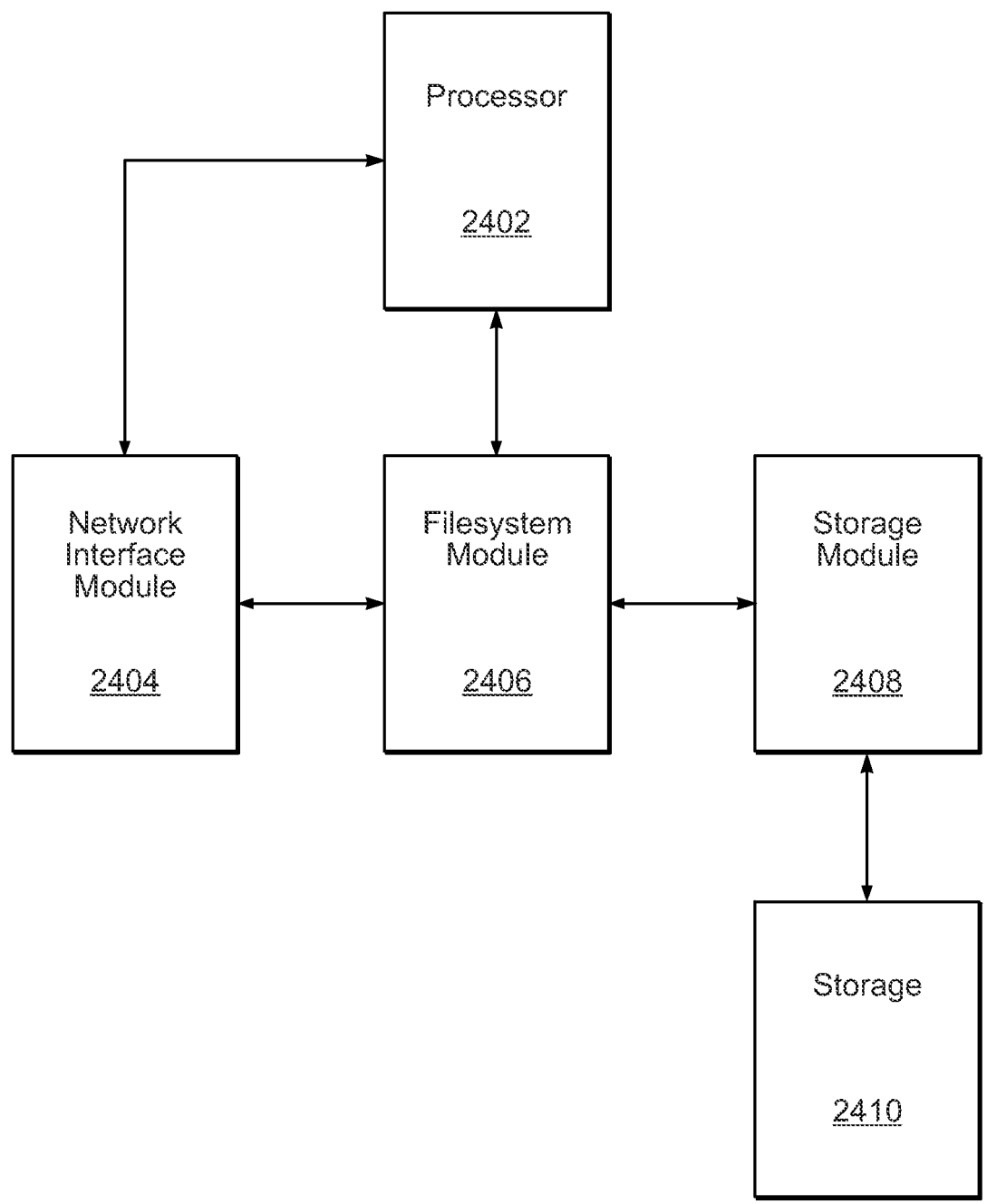
FIG. 24 is a schematic block diagram of the relevant components of a NAS server in accordance with an exemplary embodiment of the present invention.

FIG. 24 is a schematic block diagram of the relevant components of a NAS server in accordance with an exemplary embodiment of the present invention. Among other things, the NAS server includes a processor 2402, a network interface module 2404, a filesystem module 2406, a storage module 2408, and storage 2410. The modules 2404, 2406, and 2408 may be implemented in software running on the processor 2404, as hardware running separately from the processor 2402, or a combination of both software and hardware. Examples of hardware-implemented and hardware-accelerated modules are included below and in U.S. Pat. No. 7,457, 822, which is hereby incorporated herein by reference in its entirety.

The network module 2404 receives and processes requests received over a network (not shown), e.g., using a network protocol such TCP/IP, and may direct requests (e.g., NFS or CIFS requests) to the processor 2402 and/or to the filesystem module 2406 as appropriate. The filesystem module 2406, typically in combination with a native filesystem application running on the processor 2402 (if the filesystem module 2406 is separate from the processor), processes requests relating to the filesystem, such as opening a file or writing to a file. The filesystem module 2406 may generate storage access requests to the storage module 2408, which interfaces with storage 2410 to satisfy the storage access requests (e.g., over a Fibre-Channel interface).

Figure 25:
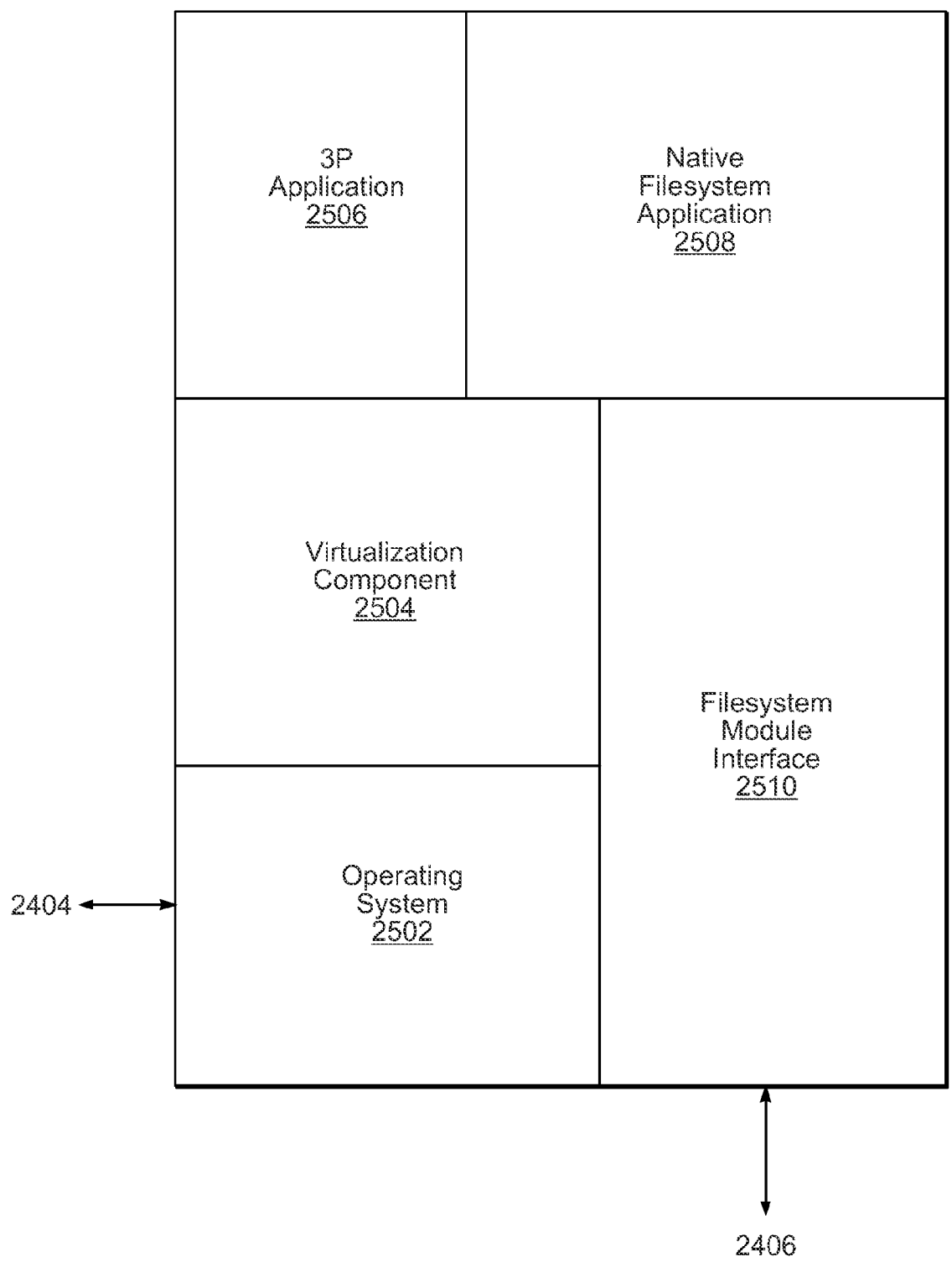
FIG. 25 is a schematic diagram of a software stack running on the processor in accordance with an exemplary embodiment of the present invention.

FIG. 25 is a schematic diagram of a software stack running on the processor 2402. Among other things, the software stack includes an operating system 2502 such as LINUX™, a virtualization component 2504 conceptually running atop the operating system 2502, a 3P application 2506 and optionally a native filesystem application 2508 conceptually running atop the virtualization component 2504, and a filesystem module interface 2510 that provides for accesses to the filesystem module 2406. In various embodiments, the filesystem module interface 2510 may be a separate component, may be part of the virtualization component, may be part of the operating system, or may be part of the native filesystem application.

When the filesystem module 2406 is implemented in hardware separate from the processor 2402, the filesystem module 2406 may include, for example, a set of registers that are accessed via the filesystem module interface 2510. Alternatively, when the filesystem module 2406 is implemented in software running on the processor 2402 (e.g., integral with the native filesystem application 2508), the filesystem module interface 2510 may be provided as an Application Program Interface (API) through which the virtualization component 2504 can make filesystem accesses.

Network requests that are directed from the network interface module 2404 to the processor 2402 are generally processed by the protocol stack of the operating system 2502, with the operating system 2502 or the virtualization component 2504 directing such requests as needed to the appropriate application. For example, NFS or CIFS filesystem-related requests may be directed to the native filesystem application, while requests relating to a web-based interface of the 3P application may be directed to the 3P application.

Figure 26:
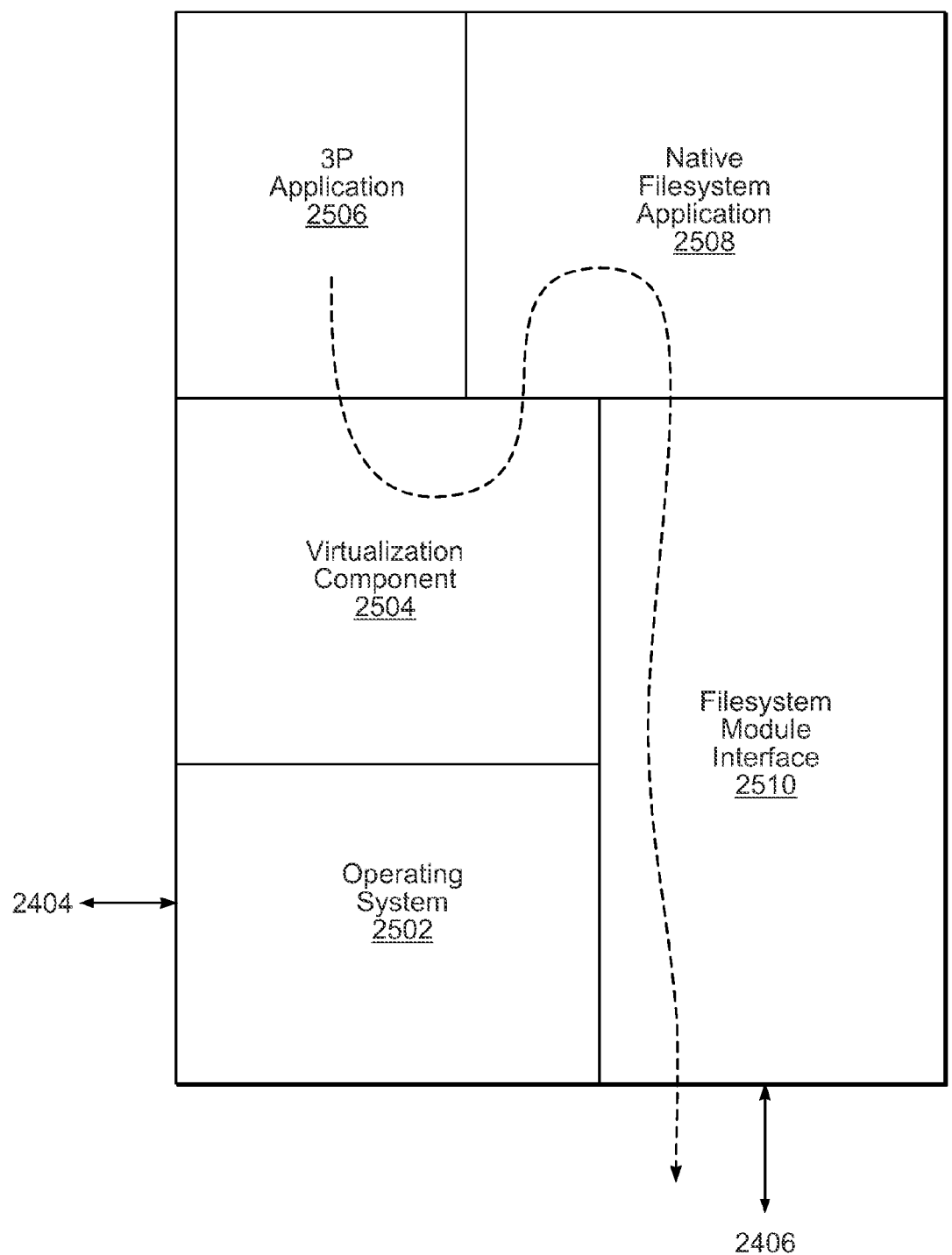
FIG. 26 shows a logic flow path in which the virtualization component directs intercepted filesystem-related system calls to the native filesystem application, in accordance with an exemplary embodiment of the present invention.
Figure 27:
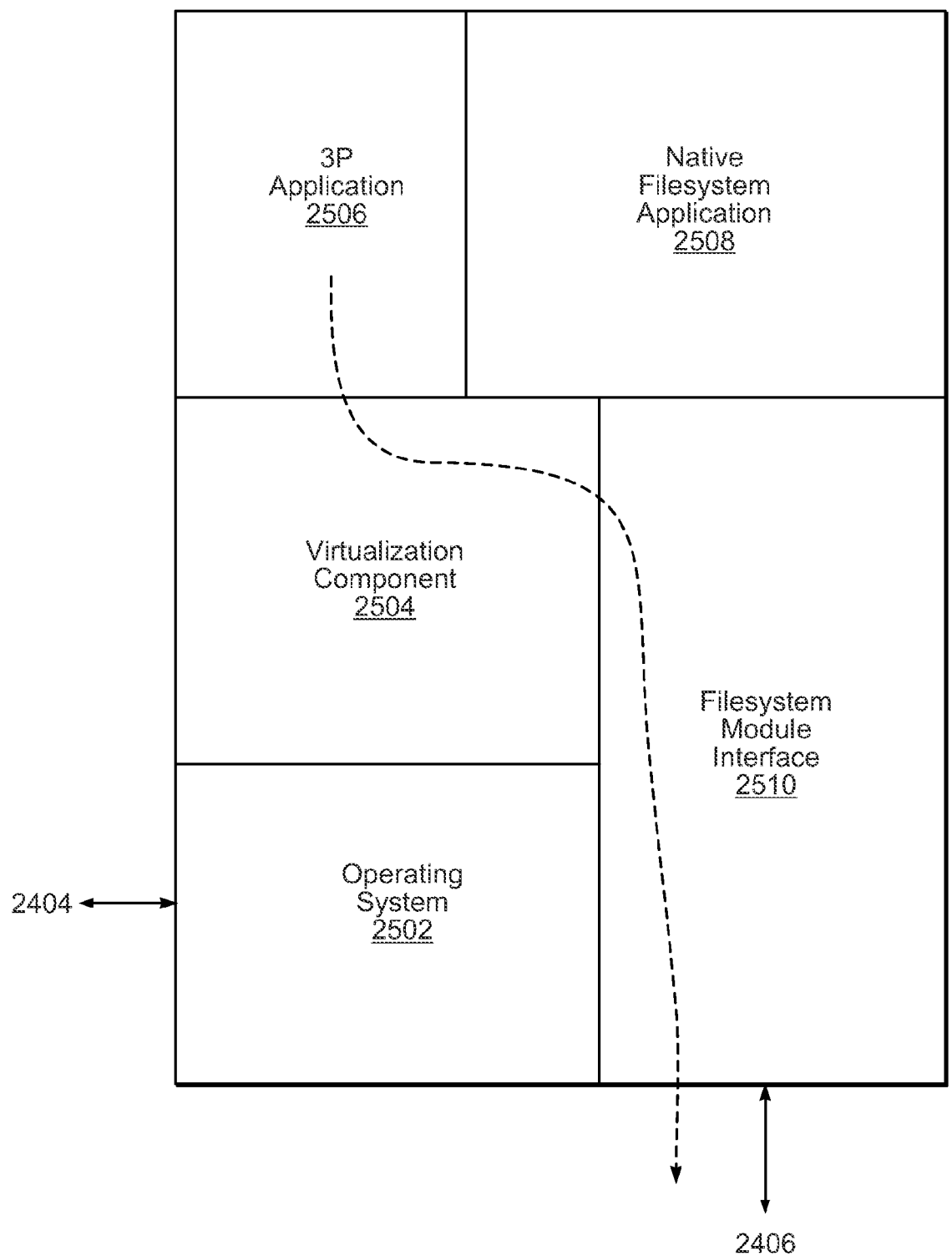
FIG. 27 shows a logic flow path in which the virtualization component processes intercepted filesystem-related system calls, in accordance with an exemplary embodiment of the present invention.
Figure 28:
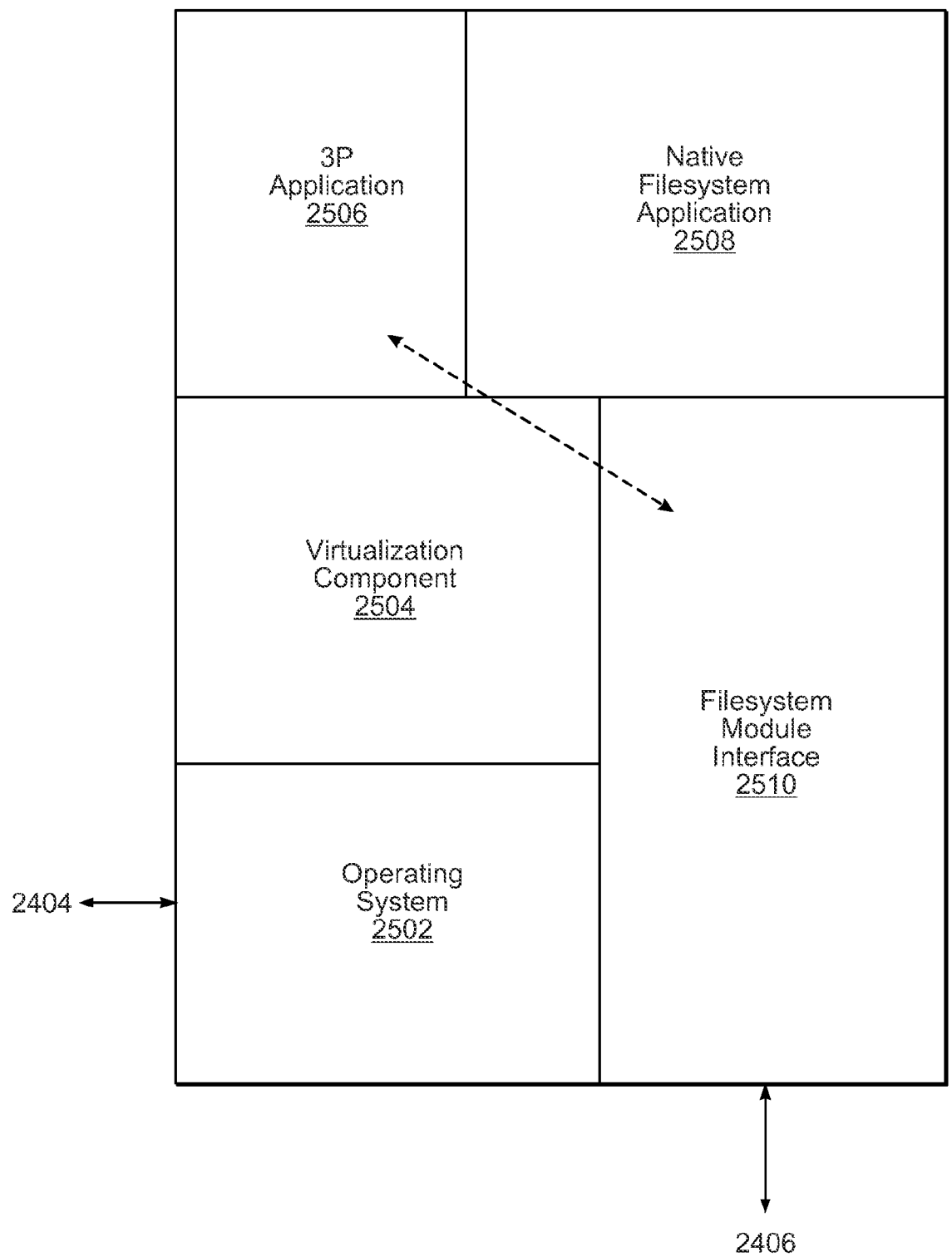
FIG. 28 shows a logic flow path in which the third-party data processing application directly interfaces with the filesystem module interface, in accordance with an exemplary embodiment of the present invention.

As discussed above, the virtualization component 2504 essentially intercepts certain filesystem-related system calls from the 3P application 2506 and directs processing of those filesystem-related system calls. The virtualization component may be implemented in whole or in part, for example, as one or more drivers or library or user level program incorporated into the operating system 2502 that are invoked when the system call is made. In some cases, the virtualization component 2504 may direct the intercepted filesystem-related system call to the native filesystem application 2508 for processing, and the native filesystem application 2508 may in turn interface with the filesystem module 2406 via the filesystem module interface 2510 to satisfy the intercepted filesystem-related system call, as depicted schematically in FIG. 26. In other cases, the virtualization component 2504 may process an intercepted filesystem-related system call, e.g., by directly utilizing the filesystem module interface 2510 to interface with the filesystem module 2406, as depicted schematically in FIG. 27. In any case, the virtualization component 2504 generally allows the intercepted filesystem-related system call to bypasses certain operating system processes including those relating to network protocol processing. Furthermore, the 3P data processing application 2506 may interface with the filesystem module 2406 directly via the filesystem module interface 2510 for certain system calls, as depicted schematically in FIG. 28.

Certain aspects of the present invention are demonstrated by the following example of file archiving. Typically, a 3P archiving application would run on a separate server and would access files by sending network requests to the NAS server, e.g., using NFS or CIFS. With the 3P archiving application running virtualized in the NAS server, however, filesystem-related system calls that previously would have generated network requests instead are intercepted by the virtualization component 2504 and converted into local requests to the filesystem module 2406, with the data moved between primary storage (e.g., FibreChannel disks) and backup storage (e.g., a tape drive connected to the NAS server) without moving across the TCP/IP network. Other types of data management applications running virtualized in the NAS server, such as deduplication and file migration applications, similarly would perform their functions locally, without the delay and unreliability of the network.

It should be noted that the 3P application 2506 can be customized to gain/provide advantages in addition to, or in lieu of, reducing network traffic, such as, for example, pre-loading directories or pre-fetching user data, that otherwise might be impossible or impractical to perform over the network. It also should be noted that the filesystem module 2406 may include, or be modified to include, any of a variety of advanced functions that can be invoked directly or indirectly by the 3P application 2506. Such advanced filesystem-related functionality may involve standard and/or non-standard system calls including, for example, accessing non-standard services provided by or through the virtualization component 2504, the native filesystem application 2508, and/or the filesystem module interface 2510. Thus, a wide range of functions and services can be accelerated, including functions and services where no POSIX semantics exist (e.g., functions and services that do not involve NFS or CIFS calls). Without limitation, some examples include:

1. For archiving applications that move older files to lower tiered storage (including "cloud") and that wish to free up data blocks, the filesystem module can provide a system call interface to perform this operation on a given file.
2. Additionally, after archiving a file and freeing its data blocks (sometimes referred to as "stubbing"), the filesystem module can selectively suppress such a stubbed file from future directory listings so the 3P application does not have to determine whether the file has already been archived; it merely will not see the file at all. This should speed up its traversal of directories significantly.
3. Also, archiving applications usually decide to archive a file based on certain criteria (e.g. size, last access time, etc.); the filesystem module can embed that criteria so that only files that match the criteria can be presented in a directory listing—similar to suppressing already stubbed files, files that do not match the criteria can also be suppressed thereby improving directory traversal time.
4. For 3P backup applications, the application can set a value in the filesystem module indicating the time the file was backed up rather than having to store that externally in a catalog, potentially accelerating overall backup performance.

Thus, filesystem-related operations that normally might require multiple transactions between the 3P data processing application and the NAS server (e.g., certain archiving, backup, deduplication functions) may be atomized into a single transaction that can be invoked directly or indirectly by the 3P data processing application. Such atomized operations typically would be provided by filesystem module although certain atomized operations additionally or alternatively may be provided by the virtualization component or the native filesystem application. Similarly, application-specific functionality that further supports the 3P data processing application (e.g., directory management functions) may be provided by the filesystem module, the virtualization component or the native filesystem application. Different types of directory listings may be provided, e.g., a directory listing excluding archived files, and directory listing of only archived files, a directory listing of files that meet archiving criteria, a directory listing of all files, etc.

Figure 10:
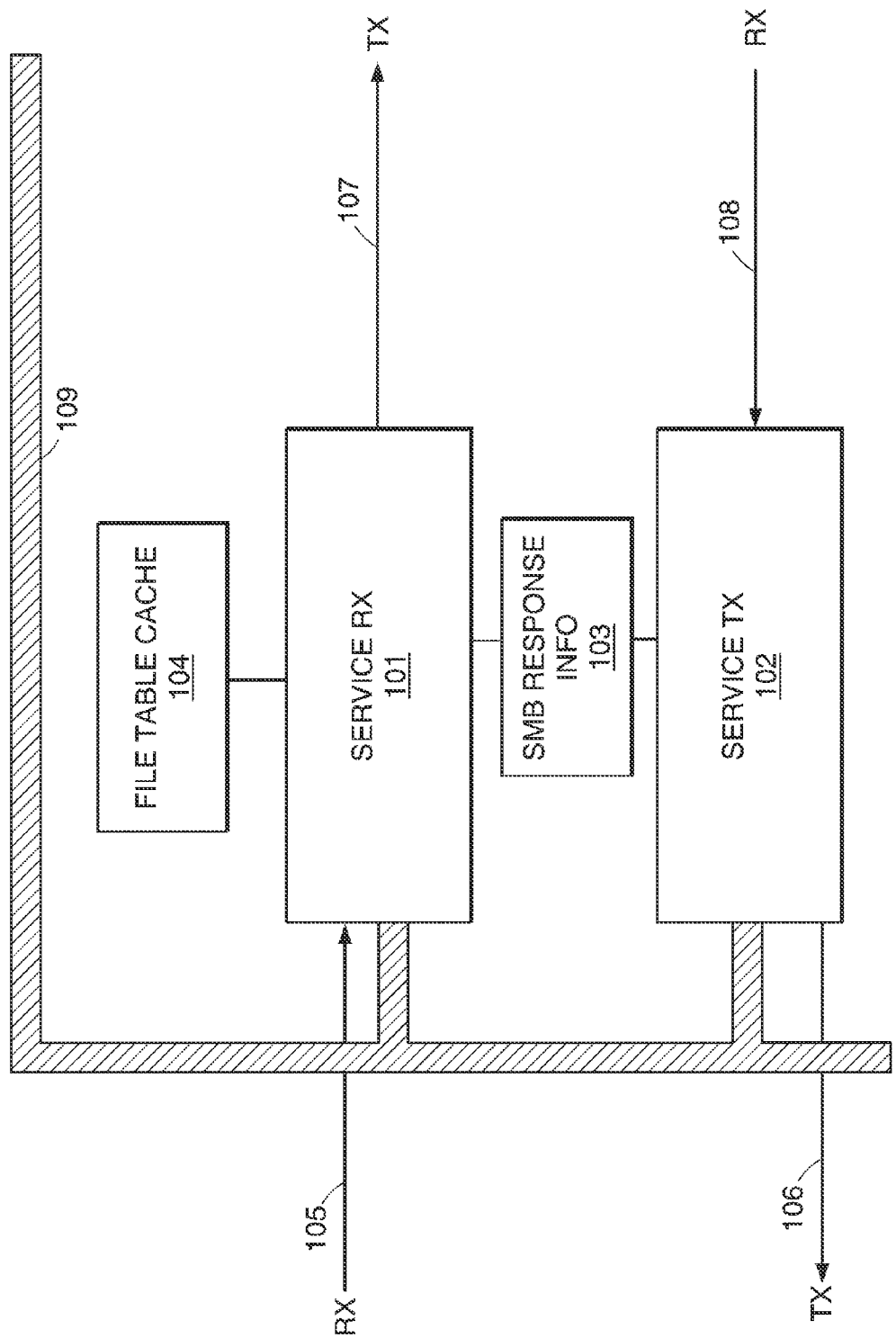
FIG. 10 is a block diagram of a hardware-implemented combination of the SMB service module 33 and file system module 34 of FIG. 3 for use in an embodiment such as illustrated in FIG. 3.
Figure 11:
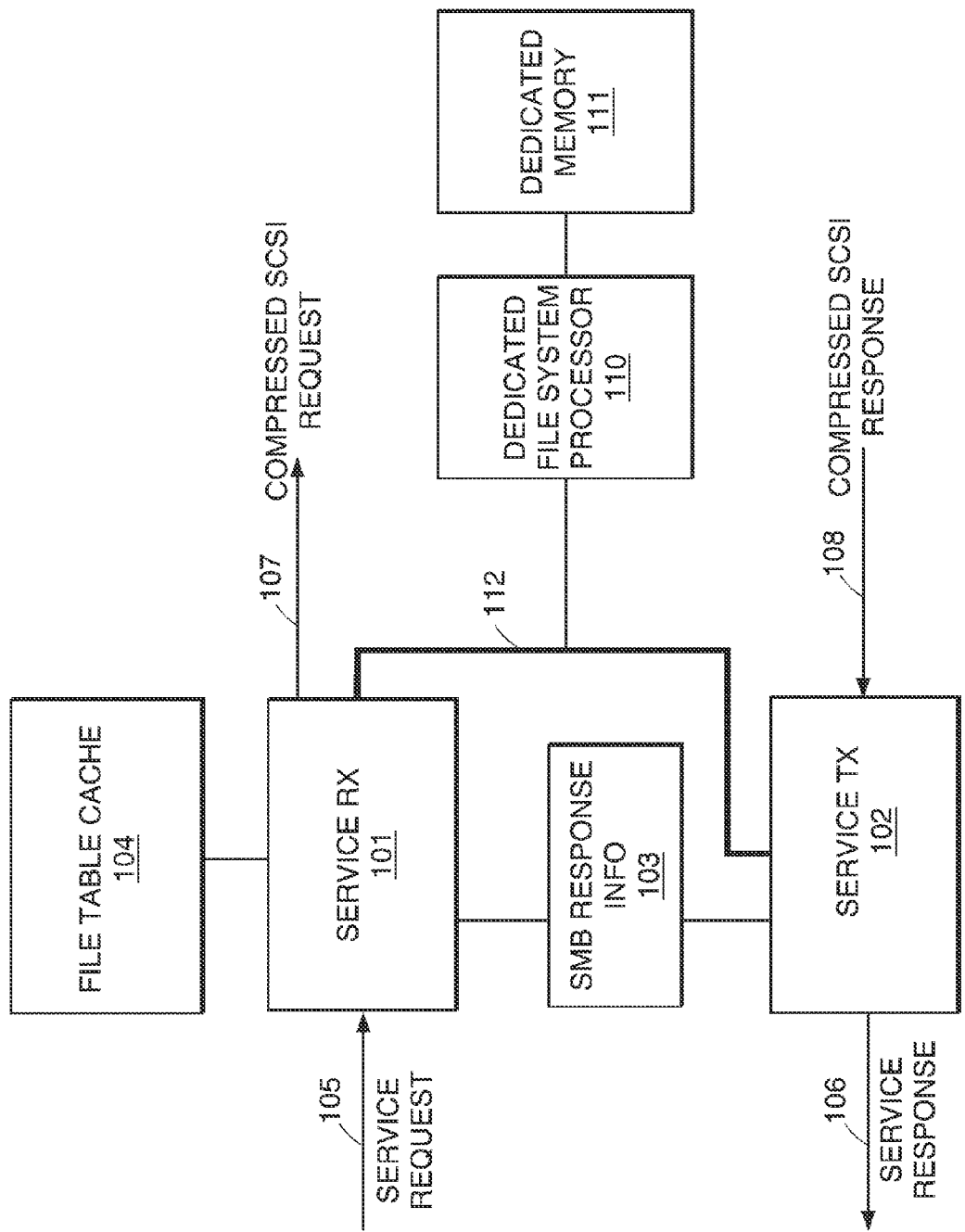
FIG. 11 is a block diagram of a hardware-accelerated combination of the SMB service module 33 and file system module 34 of FIG. 3 for use in an embodiment such as illustrated in FIG. 3.

Embodiments of the present invention may be employed in certain hardware-implemented and hardware-accelerated systems of the types described below, in which operating system functions (including filesystem functions) may be implemented wholly or partly in hardware running outside the immediate control of a processor that is in communication with the service/filesystem hardware. For example, FIG. 10 schematically shows a hardware-implemented service/filesystem module in communication with a host system processor over a PCI bus. FIG. 11 shows a similar hardware-accelerated service/filesystem module in communication with a dedicated filesystem processor over a PCI bus. In such embodiments, the host processor or dedicated filesystem processor may run a software stack of the type shown in FIG. 25, with the virtualization component and filesystem module interface allowing the 3P application to communicate directly with the service/filesystem module instead of over a network, so as to give the 3P application rapid, hardware-implemented or hardware-accelerated file system accesses, outside the purview of a traditional operating system.

As discussed in United States Publication No. 2009/0292850, which was incorporated by reference above, such hardware-based service/filesystem modules may be implemented, for example, as a file system adapter card that may be plugged into a host computer system for providing hardware-based file system accesses outside the purview of the host system. Such a file system adapter card typically includes a file service subsystem that receives file service requests and fulfills such service requests and in doing so may issue storage arrangement access requests to a storage arrangement, and also includes a computer bus, coupled to the file service subsystem, that permits the host system to communicate directly with the file service subsystem for providing file service requests and receiving file service responses, wherein the file service subsystem includes dedicated hardware that operates outside the immediate control of the host system, the dedicated hardware including specialized circuitry for performing at least one major file service function for the host system. The file service subsystem may include a processor in communication with the dedicated hardware, wherein the processor runs a software program and the dedicated hardware operates outside the immediate control of the software program.

FIG. 1 is a schematic representation of an embodiment of the present invention configured to handle service requests over a network. Thus, this embodiment includes configurations in which there is provided a file server or a web server. The embodiment 11 of the present invention is coupled to the network 10 via the network interface 13. The network 10 may include, for example, communications links to a plurality of workstations. The embodiment 11 here is also coupled to a plurality of storage devices 12 via storage interconnect 14. The embodiment 11 may be hardware implemented or hardware accelerated (or utilize a combination of hardware implementation and hardware acceleration).

Figure 2:
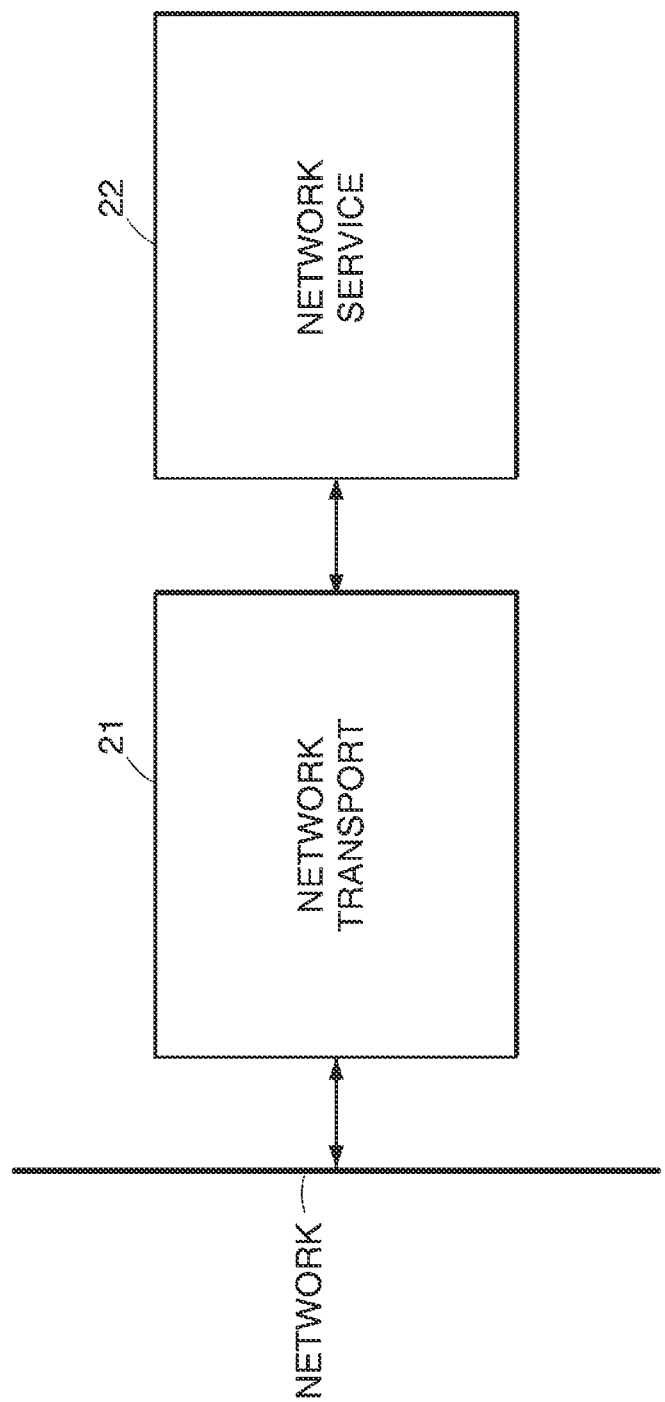
FIG. 2 is a block diagram of the embodiment illustrated in FIG. 1.

FIG. 2 is a block diagram of the embodiment illustrated in FIG. 1. The network subsystem 21 receives and transmits network service requests and responses. The network subsystem 21 is coupled to the service subsystem 22, which satisfies the network service requests. The network subsystem 21, the service subsystem 22, or both subsystems may be either hardware implemented or hardware accelerated.

Figure 3:
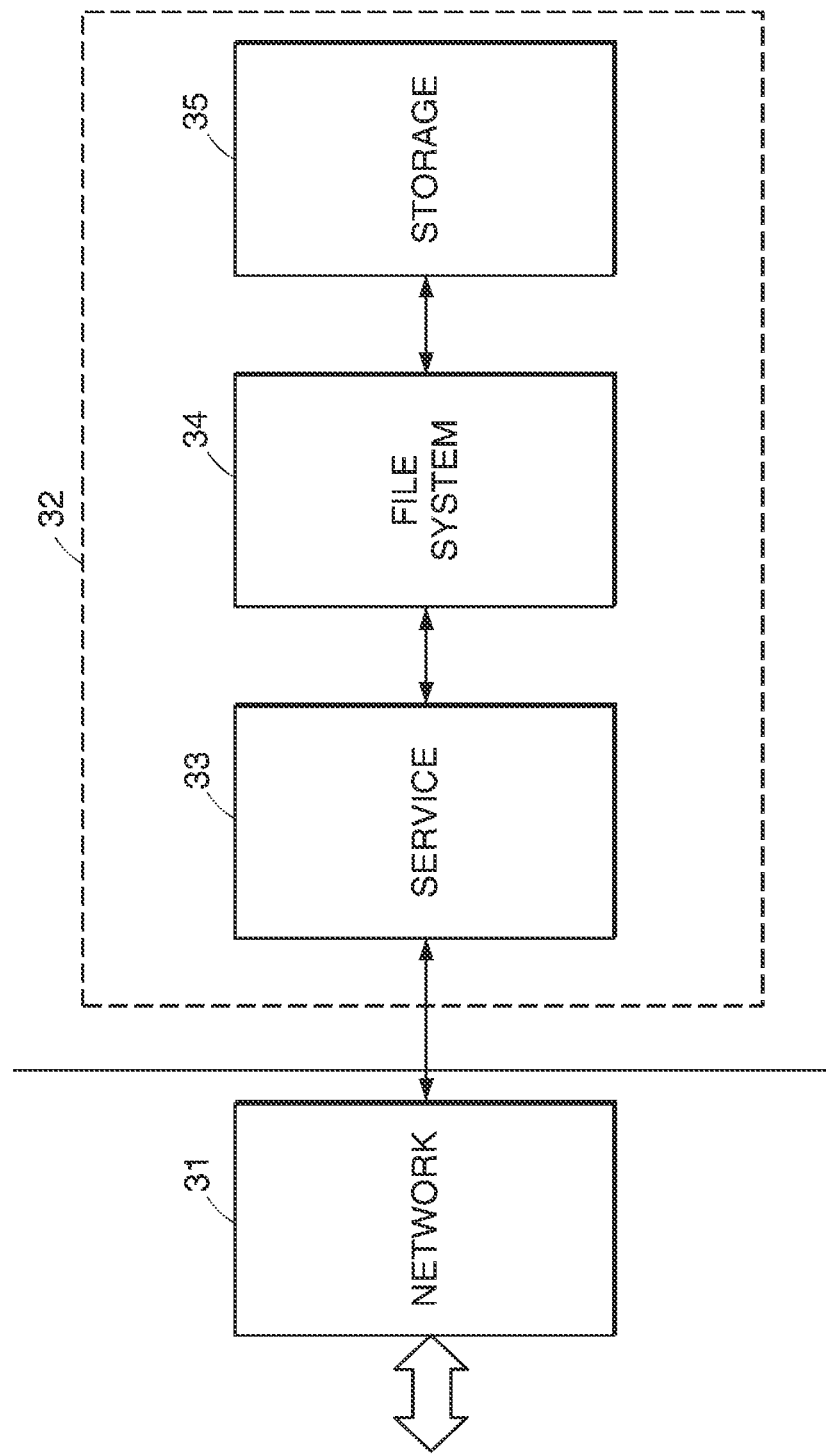
FIG. 3 is a block diagram of the embodiment of FIG. 1 configured as a file server.

FIG. 3 is a block diagram of the embodiment of FIG. 1, more particularly configured as a file server. The network subsystem 31 receives and transmits network service requests and responses. The network subsystem 31 is coupled to the service subsystem 32. The service subsystem includes three modules: the service module 33, the file system module 34, and the storage module 35. The service module 33 analyzes network service requests passed to the service subsystem 32 and issues, when appropriate, a corresponding storage access request. The network service request may be conveyed in any of a variety of protocols, such as CIFS, SMB, NFS, or FCP. The service module 33 is coupled to the file system module 34. If the network service request involves a storage access request, the file system module 34 converts requests for access to storage by converting the request into a format consistent with the file storage protocol (for example, HTFS, NTFS, FAT, FAT16, or FAT32) utilized by the storage medium. The storage module 35 converts the output of the file system module 34 into a format (such as SCSI) consistent with the bus requirements for directly accessing the storage medium to which the service subsystem 32 may be connected.

Figure 4:
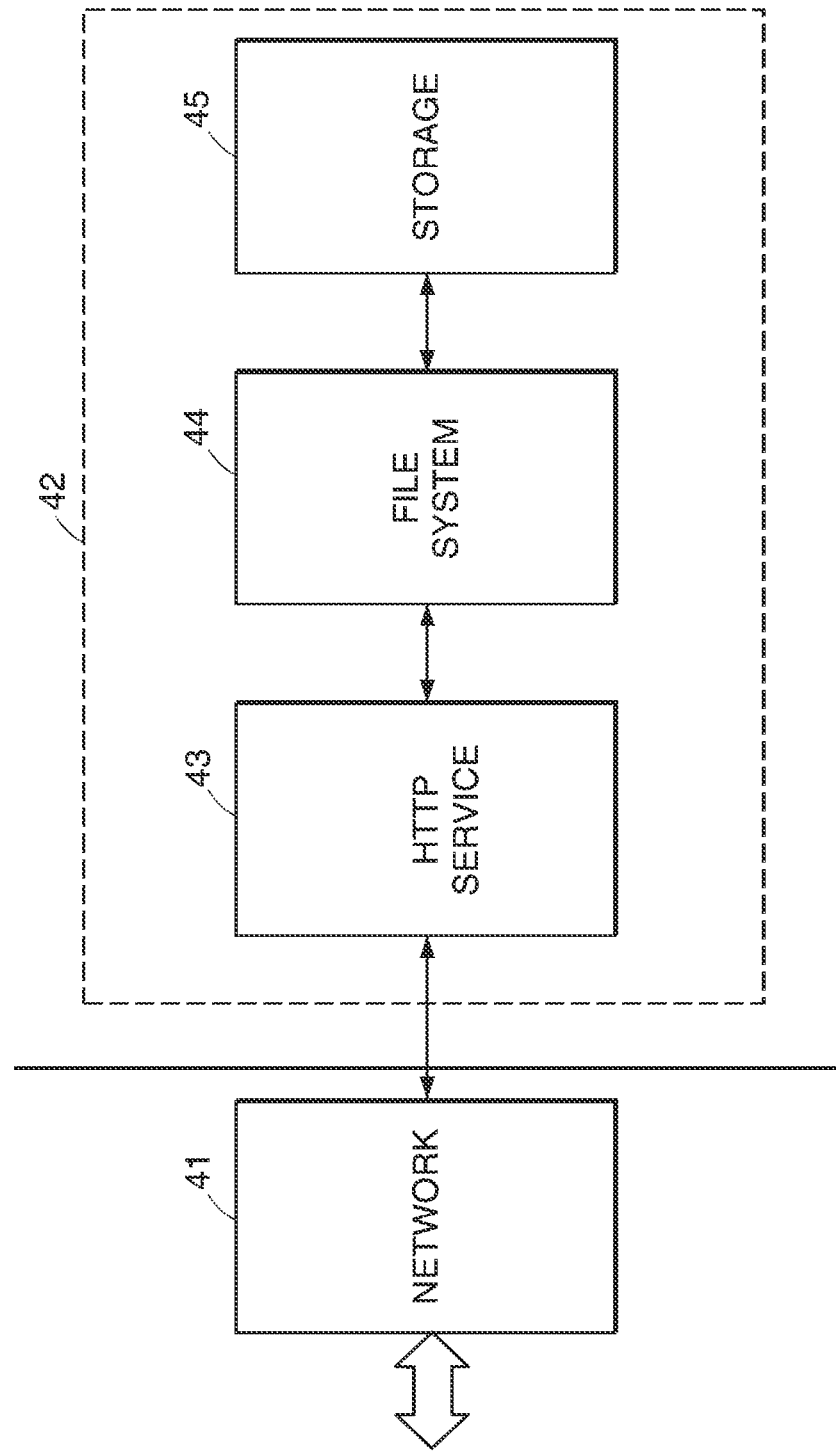
FIG. 4 is a block diagram of the embodiment of FIG. 1 configured as a web server.

FIG. 4 is similar to FIG. 3, and is a block diagram of the embodiment of FIG. 1 configured as a web server. The network subsystem 41 receives and transmits network service requests and responses. The network subsystem 41 is coupled to the service subsystem 42. The service subsystem includes three modules: the service module 43, the file system module 44, and the storage module 45. The service module 43 analyzes network service requests passed to the service subsystem 32 and issues, when appropriate, a corresponding storage access request. Here, the network service request is typically in the HTTP protocol. The service module 43 is coupled to the file system module 44, which is coupled to the storage module 45; the file system module 44 and the storage module 45 operate in a manner similar to the corresponding modules 34 and 35 described above in connection with FIG. 3.

Figure 5:
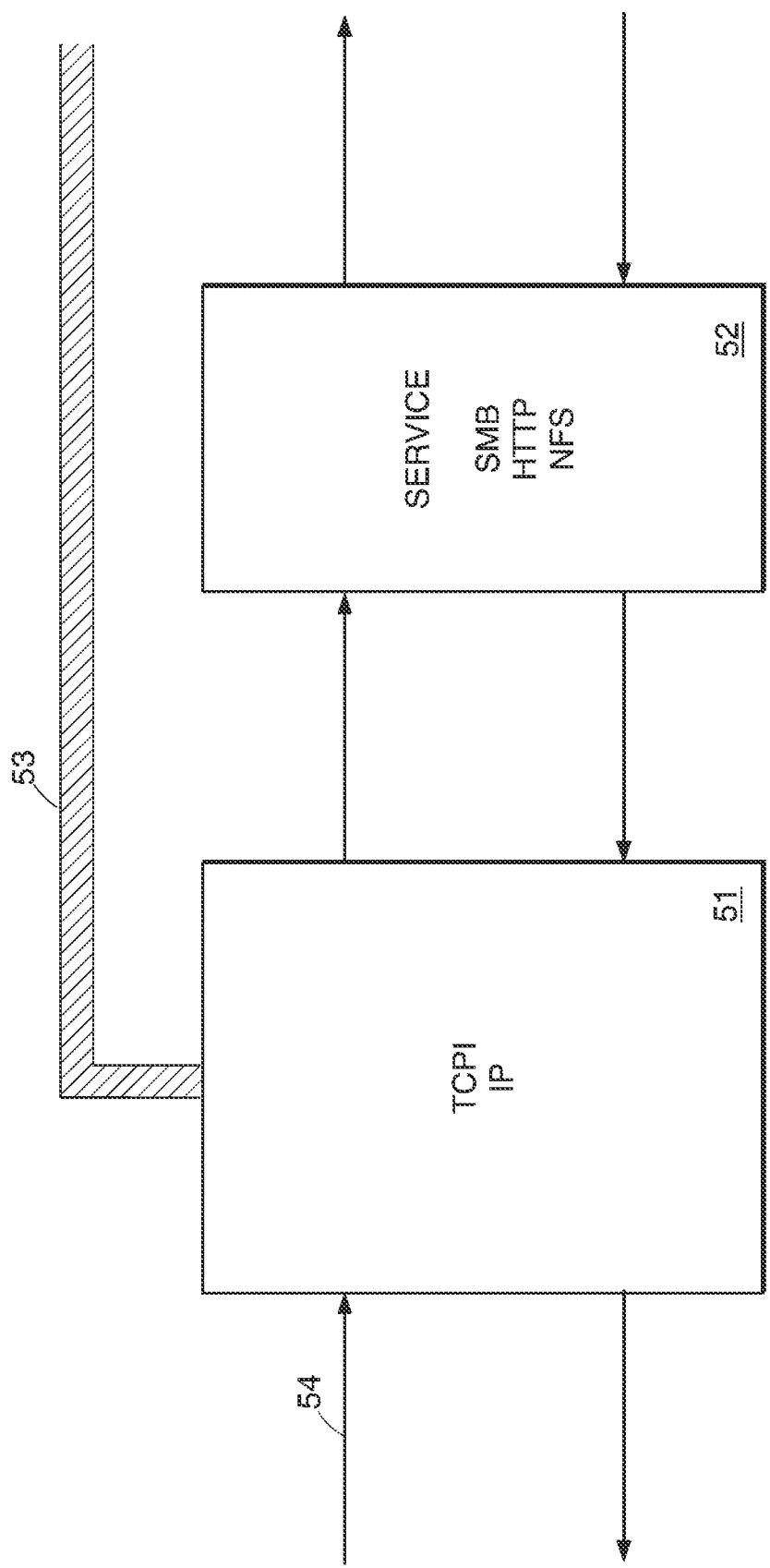
FIG. 5 is the network subsystem of the embodiments of FIGS. 2-4.

FIG. 5 is the network subsystem and service subsystem of the embodiments of FIGS. 2-4. The network subsystem 51 receives encapsulated data from the network receive interface 54 and de-encapsulates the data in accordance with the TCP/IP or other protocol bus 53. The network subsystem 51 is also coupled to the PCI bus 53 to provide to a local processor (which is also coupled to the PCI bus) to access data over the network. The network subsystem 51 also transmits the data to the service subsystem 52, and the data to be transmitted may come from the network receive interface 54 or the local processor via the PCI bus 53. The service subsystem 52, in turn, operates in a manner similar to the service subsystems 22, 32, and 42 FIGS. 2, 3, and 4 respectively.

Figure 6:
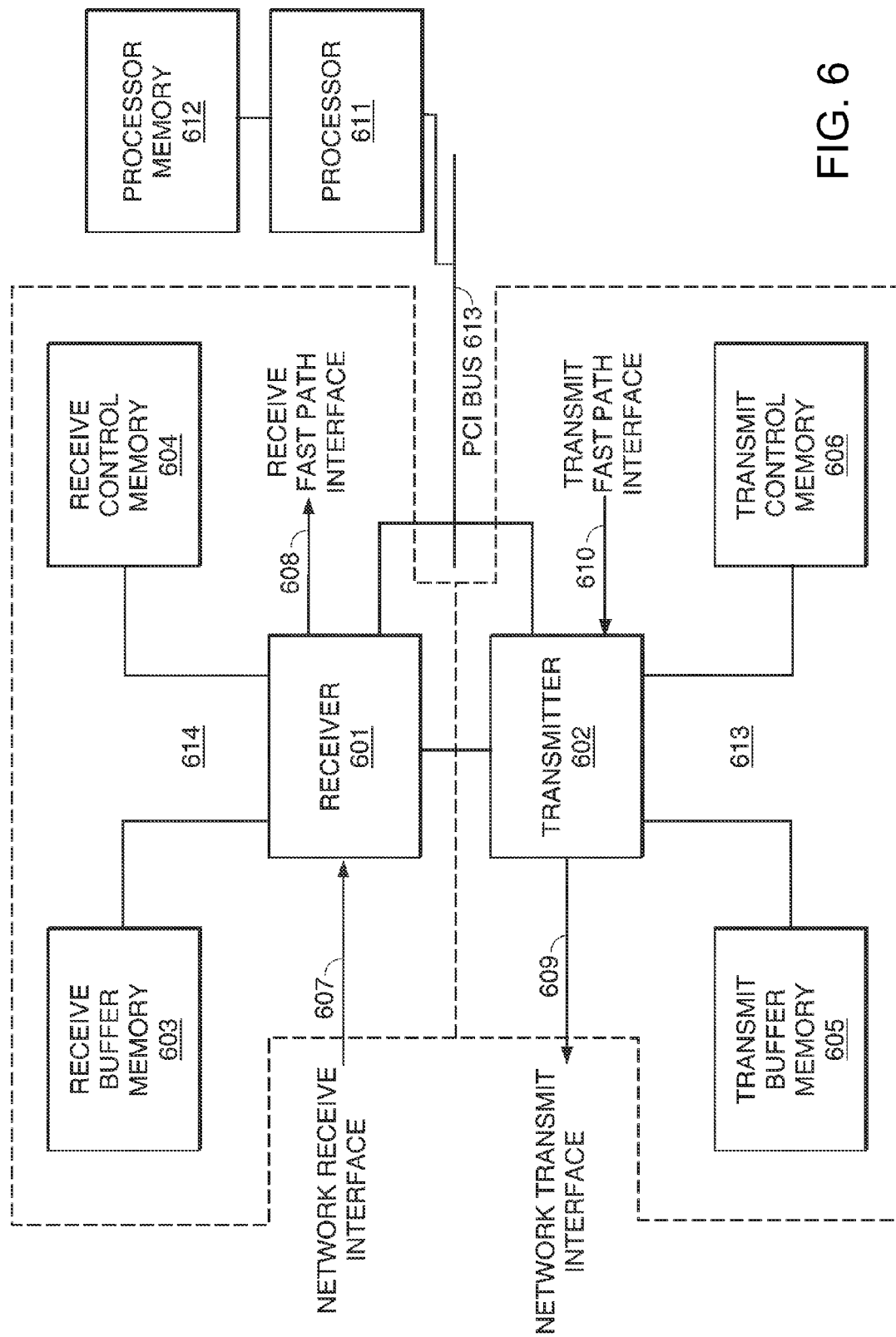
FIG. 6 is a block diagram of the network subsystem of FIG. 5.

FIG. 6 is a detailed block diagram of the network subsystem 51 of FIG. 5. The network subsystem of FIG. 6 includes a receiver module 614 (which includes a receiver 601, receive buffer memory 603, and receive control memory 604) and a transmitter module 613 (which includes transmitter 602, transmit buffer memory 605, and transmit control memory 606). The processor 611 is used by both the receiver module 614 and the transmitter module 613. The receiver 601 receives and interprets encapsulated data from the network receive interface 607. The receiver 601 de-encapsulates the data using control information contained in the receive control memory 604 and transmit control memory 606 and stores the de-encapsulated data in the receive buffer memory 603, from where it is either retrieved by the processor 611 via PCI bus 613 or output to the receive fast path interface 608. Memory 612 is used by processor 611 for storage of data and instructions.

The transmitter 602 accepts transmit requests from transmit fast path interface 610 or from the processor 611 via PCI bus 613. The transmitter 602 stores the data in transmit buffer memory 605. The transmitter 602 encapsulates the transmit data using control information contained in the transmit control memory 606 and transmits the encapsulated data over the network via the network transmit interface 609.

Figure 7:
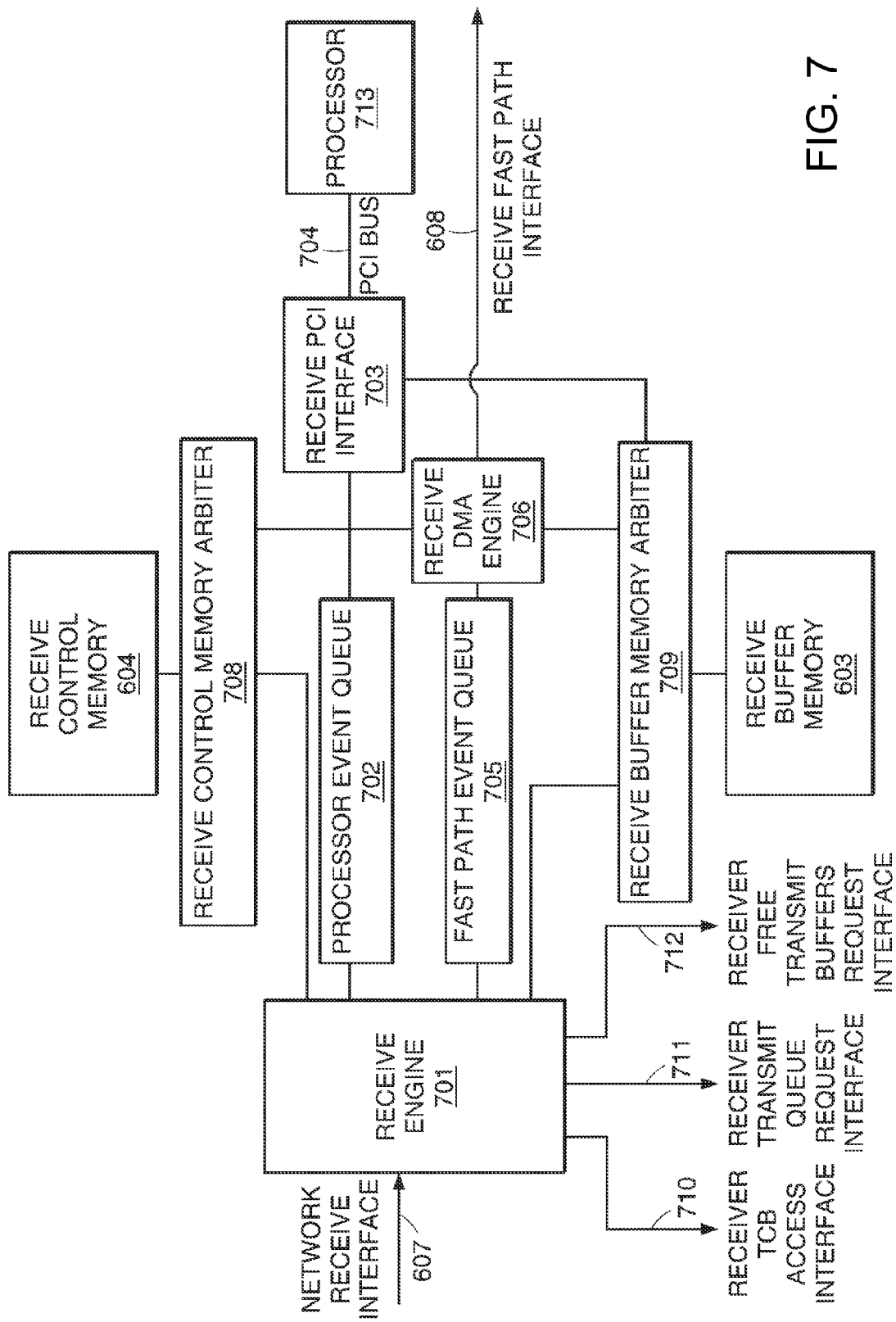
FIG. 7 is a block diagram of the receive module of the network subsystem of FIG. 6.

FIG. 7 is a block diagram of the receive module 614 of the network subsystem of FIG. 6. Packets are received by the receive engine 701 from the network receive interface 607. The receive engine 701 analyzes the packets and determines whether the packet contains an error, is a TCP/IP packet, or is not a TCP/IP packet. A packet is determined to be or not to be a TCP/IP packet by examination of the network protocol headers contained in the packet. If the packet contains an error then it is dropped.

If the packet is not a TCP/IP packet then the packet is stored in the receive buffer memory 603 via the receive buffer memory arbiter 709. An indication that a packet has been received is written into the processor event queue 702. The processor 713 can then retrieve the packet from the receive buffer memory 603 using the PCI bus 704 and the receive PCI interface block 703.

If the packet is a TCP/IP packet, then the receive engine 701 uses a hash table contained in the receive control memory 604 to attempt to resolve the network addresses and port numbers, contained within the protocol headers in the packet, into a number which uniquely identifies the connection to which this packet belongs, i.e., the connection identification. If this is a new connection identification, then the packet is stored in the receive buffer memory 603 via the receive buffer memory arbiter 709. An indication that a packet has been received is written into the processor event queue 702. The processor 713 can then retrieve the packet from the receive buffer memory 603 using the PCI bus 704 and the receive PCI interface block 703. The processor can then establish a new connection if required as specified in the TCP/IP protocol, or it can take other appropriate action.

If the connection identification already exists, then the receive engine 701 uses this connection identification as an index into a table of data which contains information about the state of each connection. This information is called the "TCP control block" ("TCB"). The TCB for each connection is stored in the transmit control memory 606. The receive engine 701 accesses the TCB for this connection via the receiver TCB access interface 710. It then processes this packet according to the TCP/IP protocol and adds the resulting bytes to the received byte stream for this connection in the receive buffer memory 603. If data on this connection is destined for the processor 713 then an indication that some bytes have been received is written into the processor event queue 702. The processor can then retrieve the bytes from the receive buffer memory 603 using the PCI bus 704 and the receive PCI interface block 703. If data on this connection is destined for the fast path interface 608, then an indication that some bytes have been received is written into the fast path event queue 705. The receive DMA engine 706 will then retrieve the bytes from the receive buffer memory 603 and output them to the fast path interface 608.

Some packets received by the receive engine 701 may be fragments of IP packets. If this is the case then the fragments are first reassembled in the receive buffer memory 603. When a complete IP packet has been reassembled, the normal packet processing is then applied as described above.

According to the TCP protocol, a connection can exist in a number of different states, including SYN_SENT, SYN_RECEIVED and ESTABLISHED. When a network node wishes to establish a connection to the network subsystem, it first transmits a TCP/IP packet with the SYN flag set. This packet is retrieved by the processor 713, since it will have a new connection identification. The processor 713 will then perform all required initialization including setting the connection state in the TCB for this connection to SYN_RECEIVED. The transition from SYN_RECEIVED to ESTABLISHED is performed by the receive engine 701 in accordance with the TCP/IP protocol. When the processor 713 wishes to establish a connection to a network node via the network subsystem, it first performs all required initialization including setting the connection state in the TCB for this connection to SYN_SENT. It then transmits a TCP/IP packet with the SYN flag set. The transition from SYN_SENT to ESTABLISHED is performed by the receive engine 701 in accordance with the TCP/IP protocol.

If a packet is received which has a SYN flag or FIN flag or RST flag set in the protocol header, and if this requires action by the processor 713, then the receive engine 701 will notify the processor of this event by writing an entry into the processor event queue 702. The processor 713 can then take the appropriate action as required by the TCP/IP protocol.

As a result of applying the TCP/IP protocol to the received packet it is possible that one or more packets should now be transmitted on this connection. For example, an acknowledgment of the received data may need to be transmitted, or the received packet may indicate an increased window size thus allowing more data to be transmitted on this connection if such data is available for transmission. The receive engine 701 achieves this by modifying the TCB accordingly and then requesting a transmit attempt by writing the connection identification into the transmit queue 802 in FIG. 8 via the receiver transmit queue request interface 711.

Received data is stored in discrete units (buffers) within the receive buffer memory 603. As soon as all the data within a buffer has been either retrieved by the processor 713 or outputted to the fast path interface 608 then the buffer can be freed, i.e., it can then be reused to store new data. A similar system operates for the transmit buffer memory 605, however, in the transmit case, the buffer can only be freed when all the data within it has been fully acknowledged, using the TCP/IP protocol, by the network node which is receiving the transmitting data. When the protocol header of the packet indicates that transmitted data has been acknowledged, then the receive engine 701 indicates this to the free transmit buffers block 805 in FIG. 8 via the receiver free transmit buffers request interface 712.

Additionally, it is possible for the receive engine 701 to process the upper layer protocol ("ULP") that runs on top of TCP/IP as well as TCP/IP itself. In this case, event queue entries are written into the processor event queue 702 and the fast path event queue 705 only when a complete ULP protocol data unit ("PDU") has been received; only complete ULP PDUs are received by the processor 713 and outputted to the fast path interface 608. An example of a ULP is NetBIOS. The enabling of ULP processing may be made on a per-connection basis; i.e., some connections may have ULP processing enabled, and others may not.

Figure 8:
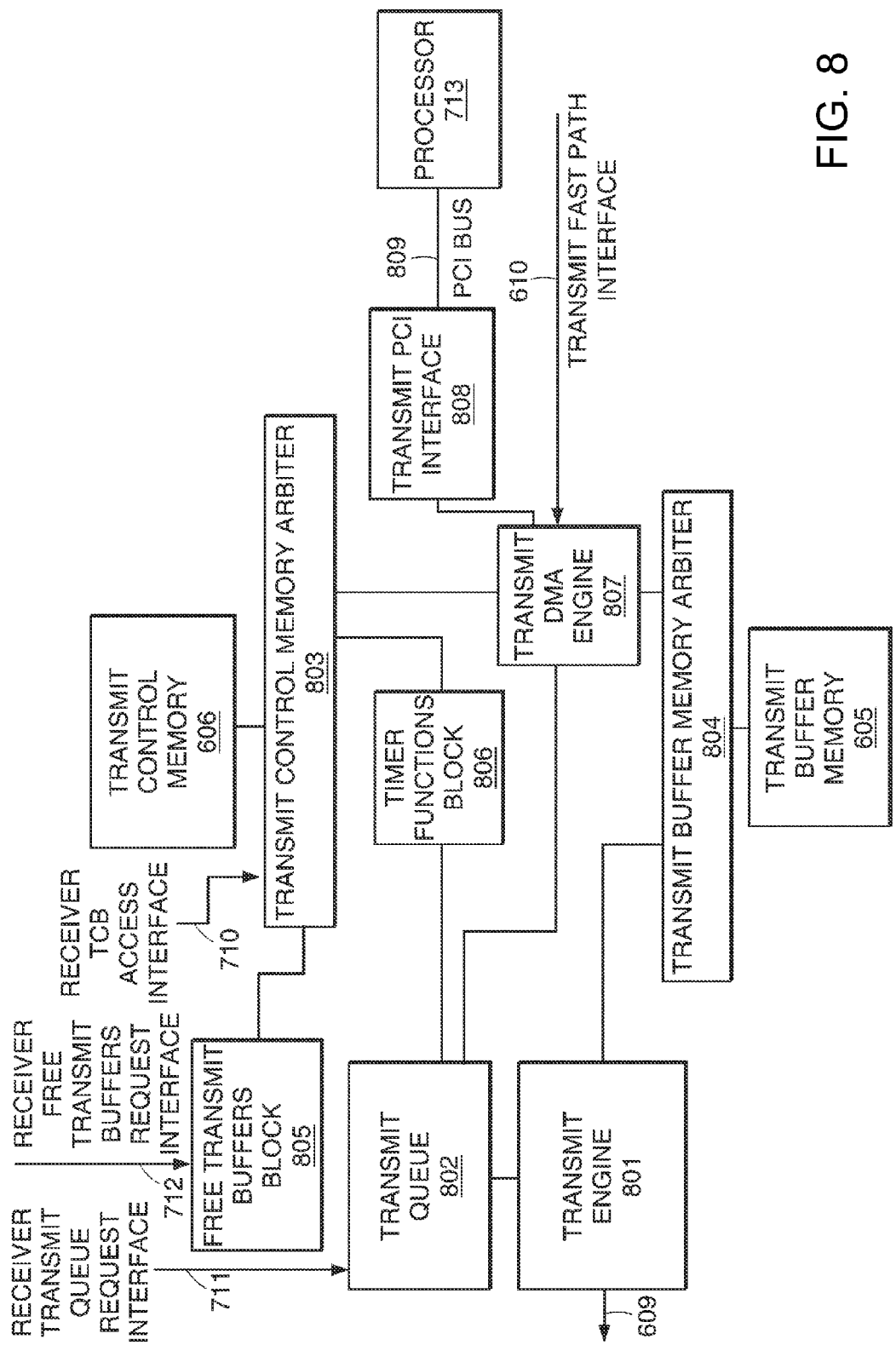
FIG. 8 is a block diagram of the transmit module of the network subsystem of FIG. 6.

FIG. 8 is a block diagram of the transmit module 613 of the network subsystem of FIG. 6. Data to be transmitted over the network using TCP/IP is inputted to the transmit DMA engine 807. This data is either input from the transmit fast path interface 610 or from the processor 713 via PCI bus 704 and the transmit PCI interface 808. In each case, the connection identification determining which TCP/IP connection should be used to transmit the data is also input. As mentioned above, each connection has an associated TCB that contains information about the state of the connection.

The transmit DMA engine stores the data in the transmit buffer memory 605, adding the inputted bytes to the stored byte stream for this connection. At the end of the input it modifies the TCB for the connection accordingly and it also writes the connection identification into the transmit queue 802.

The transmit queue 802 accepts transmit requests in the form of connection identifications from three sources: the received transmit queue request interface 711, the timer functions block 806, and the transmit DMA engine 807. As the requests are received they are placed in a queue. Whenever the queue is not empty, a transmit request for the connection identification at the front of the queue is passed to the transmit engine 801. When the transmit engine 801 has completed processing the transmit request this connection identification is removed from the front of the queue and the process repeats.

The transmit engine 801 accepts transmit requests from the transmit queue 802. For each request, the transmit engine 801 applies the TCP/IP protocol to the connection and transmit packets as required. In order to do this, the transmit engine 801 accesses the TCB for the connection in the transmit control memory 606, via the transmit control memory arbiter 803, and it retrieves the stored byte stream for the connection from the transmit buffer memory 605 via the transmit buffer memory arbiter 804.

The stored byte stream for a connection is stored in discrete units (buffers) within the transmit buffer memory 605. As mentioned above, each buffer can only be freed when all the data within it has been fully acknowledged, using the TCP/IP protocol, by the network node which is receiving the transmitting data. When the protocol header of the packet indicates that transmitted data has been acknowledged then the receive engine 701 indicates this to the free transmit buffers block 805 via the receiver free transmit buffers request interface 712. The free transmit buffers block 805 will then free all buffers which have been fully acknowledged and these buffers can then be reused to store new data.

TCP/IP has a number of timer functions which require certain operations to be performed at regular intervals if certain conditions are met. These functions are implemented by the timer functions block 806. At regular intervals the timer functions block 806 accesses the TCBs for each connection via the transmit control memory arbiter 803. If any operation needs to be performed for a particular connection, then the TCB for that connection is modified accordingly and the connection identification is written to the transmit queue 802.

Additionally it is possible for the transmit DMA engine 807 to process the upper layer protocol that runs on top of TCP/IP. In this case, only complete ULP protocol data units are inputted to the transmit DMA engine 807, either from the processor 713 or from the transmit fast path interface 610. The transmit DMA engine 807 then attaches the ULP header at the front of the PDU and adds the "pre-pended" ULP header and the inputted bytes to the stored byte stream for the connection. As discussed in connection with FIG. 7 above, an example of a ULP is NetBIOS. The enabling of ULP processing may be made on a per-connection basis; i.e., some connections may have ULP processing enabled, and others may not.

If the processor 713 wishes to transmit a raw packet, i.e., to transmit data without the hardware's automatic transmission of the data using TCP/IP, then when the processor 713 inputs the data to the transmit DMA engine 807 it uses a special connection identification. This special connection identification causes the transmit engine 801 to transmit raw packets, exactly as input to the transmit DMA engine 807 by the processor 713.

Figure 9:
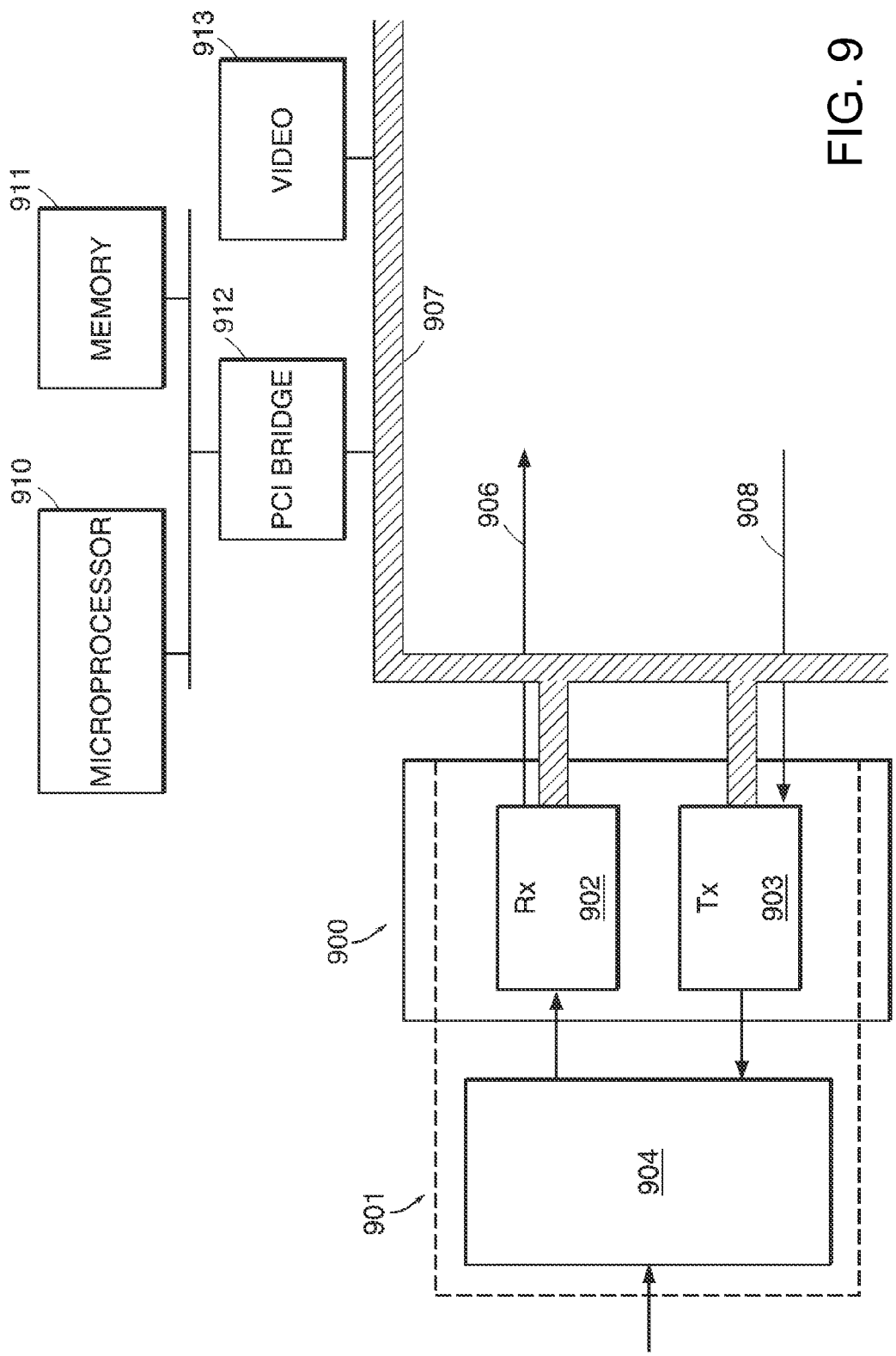
FIG. 9 is a block diagram illustrating use of the network subsystem of FIG. 5 as a network interface adapter for use with a network node, such as a workstation or server.

FIG. 9 is a block diagram illustrating use of the network subsystem of FIG. 5 as a network interface adapter for use with a network node, such as a workstation or server. In this embodiment, the network subsystem 901 is integrated into an adapter card 900 that is plugged into a computer. The adapter card 900 is coupled to the network via the network interface 904. The adapter card 900 is also coupled to the computer's microprocessor 910 via the PCI bus 907 and the PCI bridge 912. The PCI bus 907 may also be used by the computer to access peripheral devices such as video system 913. The receive module 902 and transmit module 903 operate in a manner similar to the receive module 614 and transmit module 613 of FIG. 6. Alternately or in addition, the adapter card 900 may be connected, via single protocol fast receive pipe 906 and single protocol fast transmit pipe 908, to a service module comparable to any of items 22, 32, 42, or 52 of FIG. 2, 3, 4, or 5 respectively, for providing rapid access to a storage arrangement by a remote node on the network or by the microprocessor 910.

FIG. 10 is a block diagram of a hardware-implemented combination of the SMB service module 33 and file system module 34 of FIG. 3 for use in an embodiment such as illustrated in FIG. 3. In the embodiment of FIG. 10, SMB requests are received on the input 105 to the service receive block 101. Ultimately, processing by this embodiment results in transmission of a corresponding SMB response over the output 106. A part of this response includes a header. To produce the output header, the input header is stored in SMB response information memory 103. The block 101 processes the SMB request and generates a response. Depending on the nature of the request, the block 101 may access the file table cache 104 and issue a disk access request; otherwise the response will be relayed directly the transmit block 102. The service transmit block 102 transmits the response, generated by block 101, over the output 106. In the event that a disk access request has been issued by block 101, then upon receipt over line 108 of a disk response, the transmit block 102 issues the appropriate SMB response over line 106. Both the receive and transmit modules 101 and 102 are optionally in communication with the host system over PCI bus 109. Such communication, when provided, permits a host system to communicate directly with the embodiment instead of over a network, so as to give the host system rapid, hardware-implemented file system accesses, outside the purview of a traditional operating system.

FIG. 11 is a block diagram of a hardware-accelerated combination of the SMB service module 33 and file system module 34 of FIG. 3 for use in an embodiment such as illustrated in FIG. 3. The operation is analogous to that described above in connection with FIG. 10 with respect to similarly numbered blocks and lines 105, 107, 108, and 106. However, the dedicated file system processor 110, in cooperation with dedicated memory 111 operating over dedicated bus 112 control the processes of blocks 101 and 102. Additionally these items provide flexibility in handling of such processes, since they can be reconfigured in software.

Figure 12A:
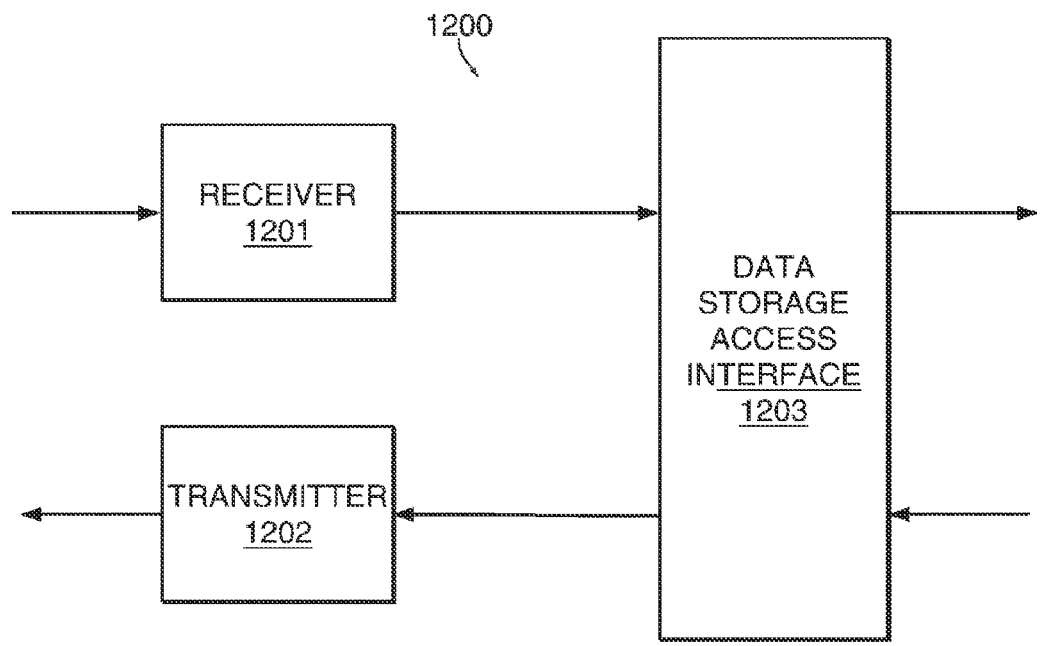
FIG. 12A is a block diagram of a hardware-implemented service module such as item 33 or 43 in FIG. 3 or FIG. 4 respectively.

FIG. 12A is a block diagram of a hardware-implemented service module such as item 33 or 43 in FIG. 3 or FIG. 4 respectively. The service module 1200 receives network service requests, fulfills such service requests, and may issue data storage access requests. The service module 1200 includes a receiver 1201 coupled to a transmitter 1202 and a data storage access interface 1203, which is also coupled to both the receiver 1201 and the transmitter 1202. The receiver 1201 receives and interprets network service requests. On receipt of a service request, the receiver 1201 either passes the request to the data storage access interface 1203 or passes information fulfilling the network service request to the transmitter 1202. If the request is passed to the data storage access interface 1203, the data storage access interface 1203 constructs and issues data storage access requests. The data storage access interface 1203 also receives replies to the data storage access requests and extracts information required to fulfill the original network service request. The information is then passed to the transmitter 1202. The transmitter 1202 processes information passed to it from the receiver 1201 or the data storage access interface 1203 and constructs and issues network service replies.

Figure 12B:
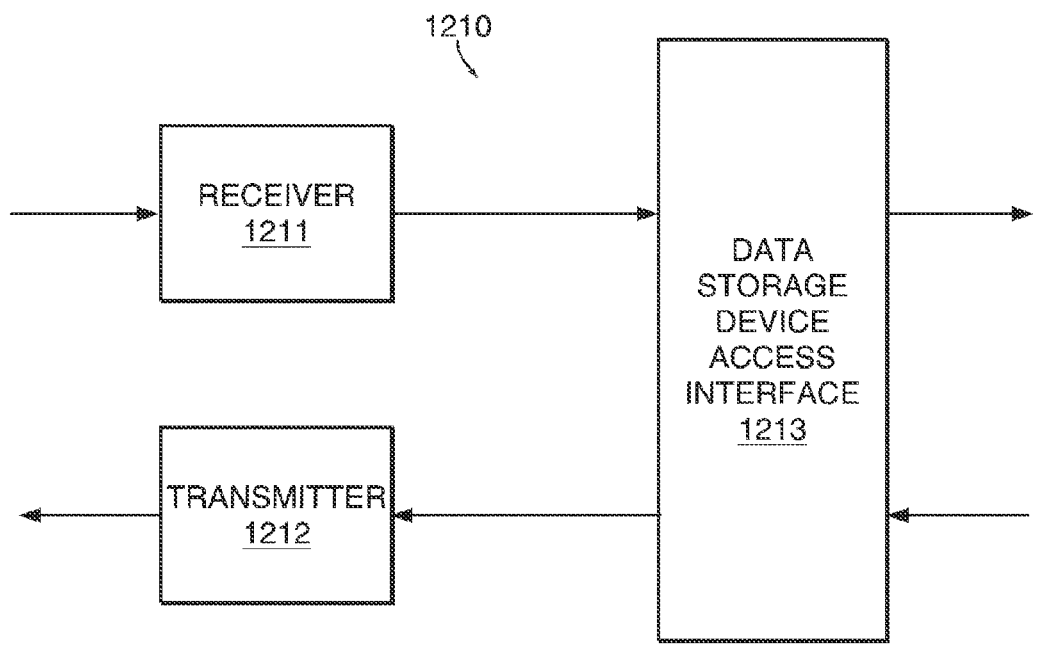
FIG. 12B is a block diagram of a hardware-implemented file module such as item 34 or 44 in FIG. 3 or FIG. 4 respectively.

FIG. 12B is a block diagram of a hardware-implemented file module such as item 34 or 44 in FIG. 3 or FIG. 4 respectively. The file system module 1210 receives data storage access requests, fulfills such data service access requests, and may issue storage device access requests. The file system module 1210 includes a receiver 1211 coupled to a transmitter 1212 and a data storage device access interface 1213 which is also coupled to both the receiver 1211 and the transmitter 1212. The receiver 1211 receives and interprets data storage access requests and either passes the request to the data storage device access interface 1213 or passes information fulfilling the data storage access request to the transmitter 1212. If the request is passed to the data storage device access interface 1213, the data storage device access interface 1213 constructs and issues data storage device access requests. The data storage device access interface 1213 also receives replies to the data storage device access requests and extracts information required to fulfill the original data storage access request. The information is then passed to the transmitter 1212. The transmitter 1212 processes information passed to it from the receiver 1211 or the data storage device access interface module 1213 and constructs and issues data storage access replies.

Figure 12C:
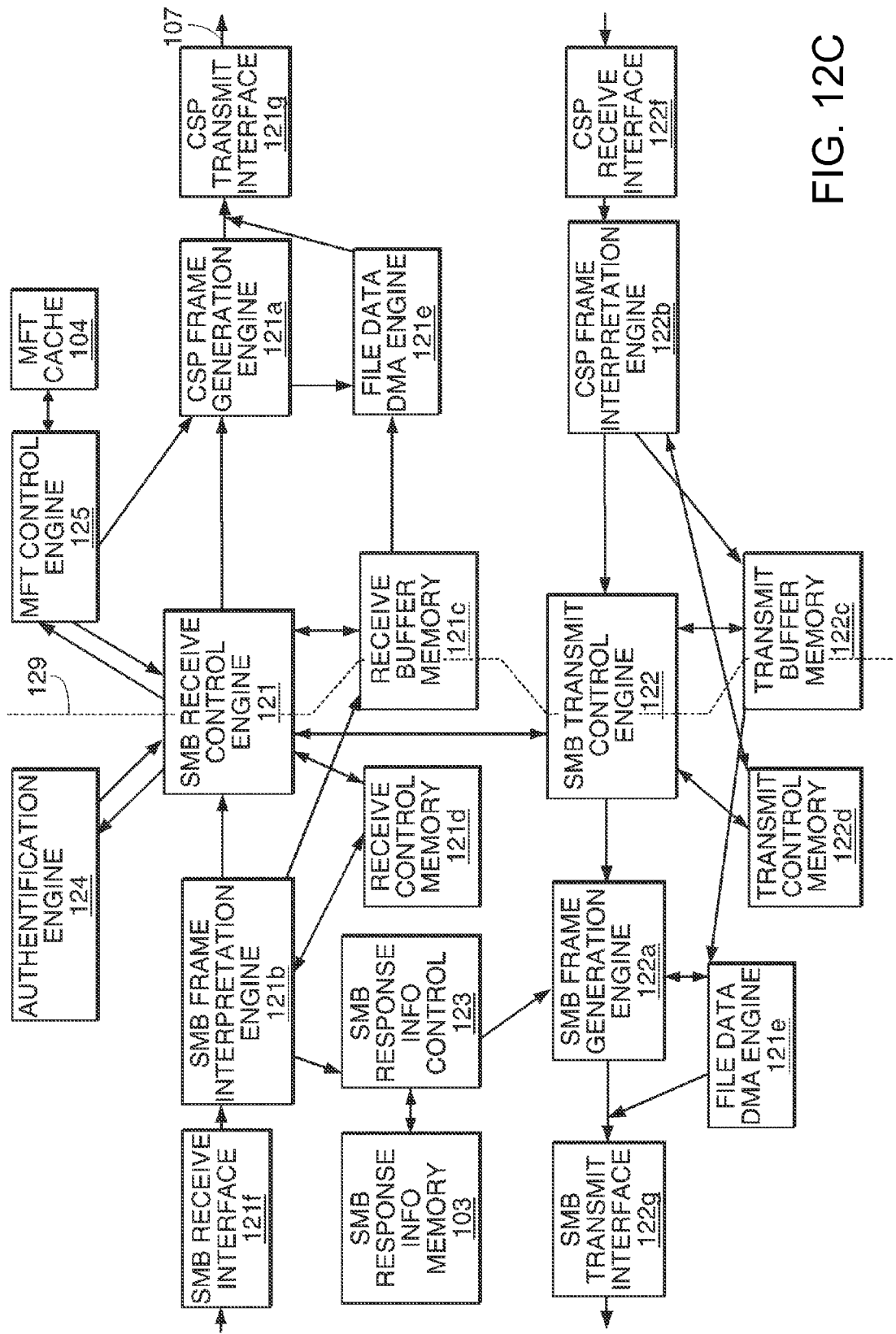
FIG. 12C is a detailed block diagram of the hardware-implemented service subsystem of FIG. 10, which provides a combined service module and file module.

FIG. 12C is a detailed block diagram of the hardware-implemented service subsystem of FIG. 10, which provides a combined service module and file module. Dashed line 129 in FIG. 12C shows the division between functions of this implementation. To the left of line 129 is the service module portion; to the right of line 129 is the file system module portion. (It will be understood, however, that the double-headed arrow connecting the SMB receive control engine 121 and the SMB transmit control engine 122 properly provides two-way communication between the engines 121 and 122 for each of the service module portion and the file system module portion.)

In FIG. 12C, SMB frames are received from the network subsystem via the network receive interface 121*f* and are passed to the SMB frame interpretation engine 121*b*. Here the frame is analyzed and a number of tasks are performed. The first section of the header is copied to the SMB response info control 123, which stores relevant information on a per connection basis in the SMB response info memory 103. The complete frame is written into buffers in the receive buffer memory 121*c* and the receive control memory 121*d* is updated. Relevant parts of the SMB frame header are passed to the SMB receive control engine 121.

The SMB receive control engine 121 of FIG. 12C parses the information from the header and, where appropriate, requests file access permission from the authentication engine 124. For SMB frames where a file access has been requested, the SMB receive control engine 121 extracts either file path information or the file identification from the SMB frame header and requests the MFT control engine 125 for the physical location of the required file data.

The MFT control engine 125 can queue requests from the SMB receive control engine 121 and similarly the SMB receive control engine 121 can queue responses from the MFT control engine 125. This allows the two engines to operate asynchronously from each other and thus allows incoming SMB frames to be processed while MFT requests are outstanding.

The MFT control engine 125 processes requests from the SMB receive control engine 121. Typically for SMB OPEN commands, a request will require a disk access to obtain the necessary physical file location information. Where this is necessary, the MFT control engine 125 passes a request to the compressed SCSI frame generation engine 121*a* that will generate the necessary compressed SCSI request. The compressed SCSI protocol ("CSP") relates to a data format from which a SCSI command may be generated in the manner described in connection with FIG. 17A and other figures below. Because compressed SCSI data is not derived from SCSI but are rather the source from which SCSI data may be derived, we sometimes refer to compressed SCSI data as "proto-SCSI" data. The relevant proto-SCSI response will be passed back to the MFT control engine 125, where it will be processed, the MFT cache 104 will be updated, and the physical file information will be passed back to the SMB receive control engine 121. Typically, for a SMB READ or WRITE command with respect to a recently accessed small file, the file information will be present in the MFT cache 104. Thus no disk access will be required.

When the SMB receive control engine 121 has received the response from an MFT request and a disk access for file data is required, as would be necessary for typical READ or WRITE commands, one or more proto-SCSI requests are passed to the proto-SCSI frame generation engine 121*a*. The proto-SCSI frame generation engine 121*a* will construct the proto-SCSI headers and, where necessary, for example, for WRITE commands, program the file data DMA engine 121*e* to pull the file data out of the receive buffer memory 121*c*. The proto-SCSI frame is then passed to the proto-SCSI module via proto-SCSI transmit interface 121*g*. Where no disk access is required, an SMB response request is passed directly to the SMB transmit control engine 122.

Proto-SCSI frames are received from the proto-SCSI module and via proto-SCSI receive interface 122*f* are passed to the proto-SCSI frame interpretation engine 122*b*. Here the frame is analyzed and a number of tasks are performed. MFT responses are passed back to the MFT control engine 125. All other frames are written into buffers in the receive buffer memory 121*c* and the receive control memory 121*d* is updated. Relevant parts of the proto-SCSI frame header are passed to the SMB transmit control engine 122.

Each SMB connection has previously been assigned a unique identification. All proto-SCSI frames include this identification and the SMB transmit control engine 122 uses this unique identification to request state information from the SMB receive control engine 121 and update this where necessary. When all necessary information for an SMB response has been received from the proto-SCSI module, the SMB transmit control engine 122 passes a request to the SMB frame generation engine 122*a*. The SMB frame generation engine 122a constructs the SMB response frame from data contained in the SMB response info memory 103 and file data stored in the SMB transmit buffer memory 122c. It then passes the frame to the SMB transmit interface 106 which in turn forwards it to the network subsystem.

Figure 13:
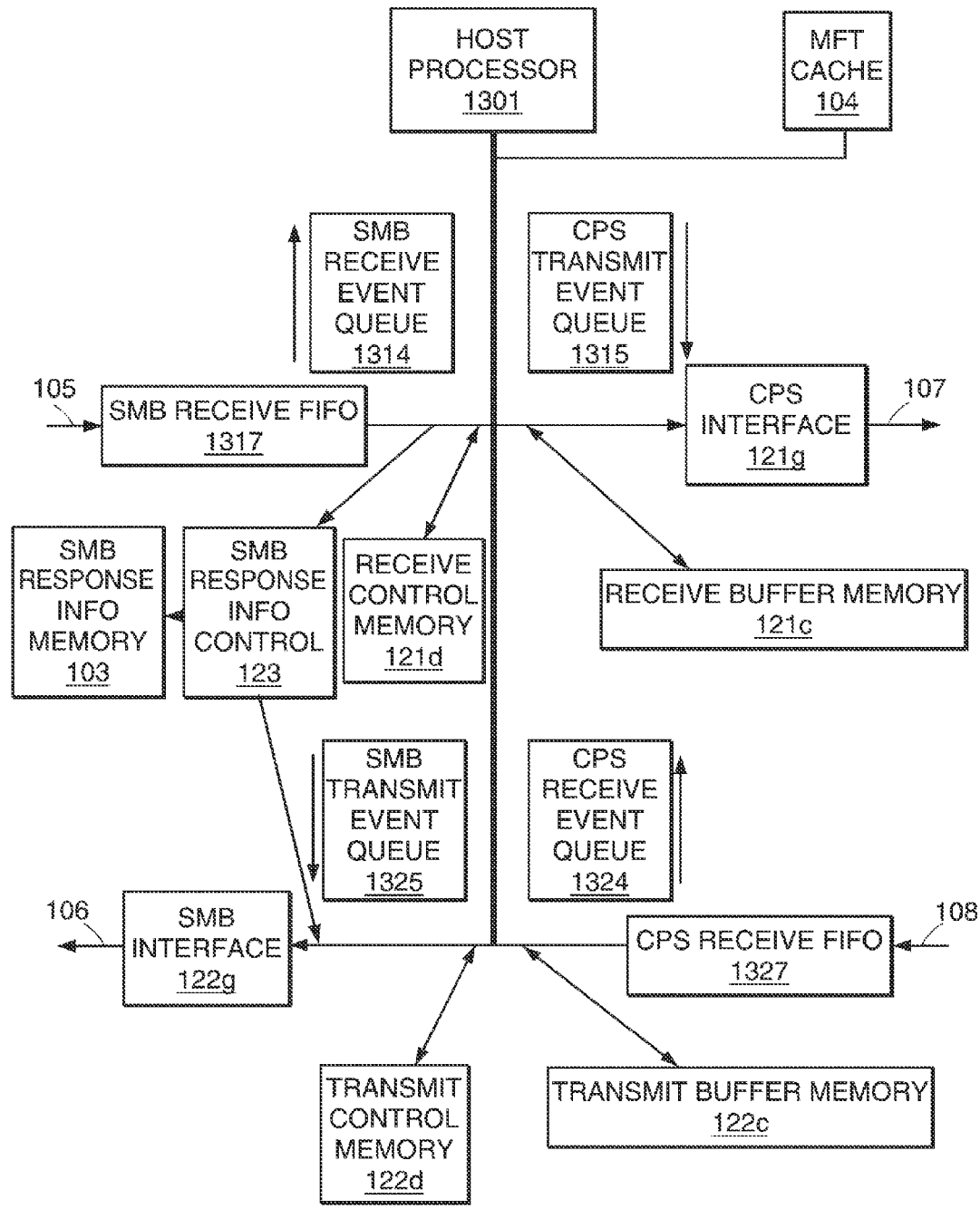
FIG. 13 is a detailed block diagram of the hardware-accelerated service subsystem of FIG. 11.

FIG. 13 is a detailed block diagram of the hardware-accelerated service subsystem of FIG. 11. Incoming SMB frames from the IP block are provided over input 105 are written, via the SMB receive FIFO 1317, into free buffers in the SMB receive buffer memory 121c. The SMB receive buffer memory 121c includes, in one embodiment, a series of receive buffers that are 2 Kb long and thus one SMB frame may straddle a number of receive buffers. As frames are written into SMB receive buffer memory 121c, SMB receive buffer descriptors are updated in the SMB receive control memory 121d. A 32-bit connection identification and a 32-bit frame byte count are passed to the SMB block from the IP block at the start of the frame. These two fields are written to the first two locations of the receive buffer in receive buffer memory 121c.

While the frame is being stored, the SMB header is also written to the SMB response info memory 103 for later use by the SMB transmit process. The unique connection identification passed to the SMB block by the IP block is used as a pointer to the appropriate info field in the SMB response info memory 103. This memory is arranged as blocks of 16 words, one block for each unique connection identification. With a 128 Mb SDRAM fitted, this allows 2M connections. At present just the first 32 bytes of the SMB frame are written to each info field.

When a complete frame has been written to the receive buffer memory 121c, an SMB buffer locator is written to the SMB receive event queue 1314 and an interrupt to the host processor 1301 is generated. The SMB buffer locator contains information pertaining to the SMB frame including a buffer pointer and a "last" bit. The buffer pointer points to the buffer in receive buffer memory 121c that contains the start of the SMB frame. The "last" bit indicates whether this buffer also contains the end of the SMB frame (i.e., whether the SMB frame is less than 2 Kb in length).

The host processor 1301 can read the SMB buffer locator in the SMB receive event queue 1314 by reading an appropriate SMB receive event register associated with the event queue 1314. By using the buffer pointer read from the SMB buffer locator, the host processor 1301 can determine the address of the first buffer of the SMB frame in the receive buffer memory 121c and can thus read the SMB header and the first part of the frame.

If the SMB frame is longer than 2 Kb and it is necessary to read more than the first 2 Kb of the SMB frame, then the receive buffer descriptor associated with this receive buffer should be read from the receive control memory 121d. This receive buffer descriptor will contain a pointer to the next buffer of the SMB frame. This next buffer will similarly have a receive buffer descriptor associated with it unless the previous buffer's descriptor contained a "last" bit indicating that the receive buffer it pointed to contained the end of the SMB frame.

After reading the received SMB frame, if none of the data contained within the frame is to be used further, then the buffers of the received frame are made available for use again by writing pointers to them to the receive free buffers queue, which is contained in the receive buffer control memory 121d, by writing to an associated receive return free buffers register.

To transmit a proto-SCSI frame the host processor 1301 firstly obtains a pointer to a free SMB receive buffer by reading from the receive fetch free buffer register. This action will pull a pointer to a free buffer from the free buffers queue contained in the receive control memory 121d. In this buffer the start of the proto-SCSI request frame can be constructed. To request the proto-SCSI transmit entity to transfer the proto-SCSI frame to the proto-SCSI entity, the host processor 1301 writes a buffer locator and buffer offset pair to the proto-SCSI transmit event queue 1315 by writing them to the receive proto-SCSI event register associated with the proto-SCSI transmit event queue 1315.

The buffer locator contains a pointer to the buffer containing data for the proto-SCSI frame. The buffer offset contains an offset to the start of the data within the buffer and a length field. The buffer locator also contains a "last" bit to indicate whether further buffer locator/buffer offset pairs will be written to the proto-SCSI transmit event queue 1315 containing pointers to more data for this proto-SCSI frame.

If the proto-SCSI frame is to include data from another SMB receive buffer, as would be typical for a SMB WRITE command, then the host processor 1301 must write another buffer locator/buffer offset pair describing this SMB receive buffer to the proto-SCSI transmit event queue 1315. If the data to be included in the proto-SCSI frame straddles more than one SMB receive buffer, then the proto-SCSI transmit entity can use the buffer pointers in the associated SMB receive buffer descriptor located in receive control memory 121d to link the data together. If the extra data is from a SMB receive frame, then these descriptors will have been filled in previously by the SMB receive entity.

Because data from SMB receive buffers may be used for more than one proto-SCSI frame, then freeing up the SMB receive buffers after they have been used is not a simple process. SMB receive buffers containing sections of a received SMB frame that are not involved in the proto-SCSI transmit can be freed by writing them back to the free buffers queue contained in the receive control memory via the associated receive return free buffer register. SMB receive buffers that contain data to be included in proto-SCSI frames can not be freed in the same way because they can not be freed until the data within them has been transmitted. Consequently, after the buffer locator/buffer offset pairs to the various proto-SCSI frames which will contain the SMB data have been written to the proto-SCSI transmit event queue 1315, pointers to the original SMB receive buffers are also written to the proto-SCSI transmit event queue 1315. These pointers are marked to indicate that they are to be freed back to the free buffers queue contained in the receive control memory 121d. As data in the proto-SCSI transmit event queue 1315 is handled in sequence, the SMB receive buffers will only be freed after any data within them has been transmitted.

Incoming proto-SCSI frames from the IP block are written, via the proto-SCSI receive FIFO 1327, into free buffers in the SMB transmit buffer memory 122c. The SMB transmit buffers are 2 Kb long and thus one proto-SCSI frame may straddle a number of transmit buffers. As frames are written into SMB transmit buffer memory 122c, SMB transmit buffer descriptors are updated in the SMB transmit control memory 122d. When a complete frame has been written to the SMB transmit buffer memory 122c, an SMB buffer locator is written to the proto-SCSI receive event queue 1324 and an interrupt to the host processor 1301 is generated. The SMB buffer locator contains information pertaining to the proto-SCSI frame, including a buffer pointer and a "last" bit. The buffer pointer points to the buffer in transmit buffer memory 122c that contains the start of the proto-SCSI frame. The "last" bit indicates whether this buffer also contains the end of the proto-SCSI frame (i.e., whether the frame is less than 2 Kb in length).

The host processor 1301 can read the buffer locator in the proto-SCSI receive event queue 1324 by reading an appropriate proto-SCSI receive event register associated with the event queue 1324. Using the buffer pointer read from the buffer locator, the host processor 1301 can determine the address of the first buffer of the proto-SCSI frame in the transmit buffer memory 122c and can thus read the header and the first part of the frame.

If the proto-SCSI frame is longer than 2 Kb, and it is necessary to read more than the first 2 Kb of the frame, the transmit descriptor associated with this transmit buffer should be read from the receive control memory 121d. The descriptor will contain a pointer to the next buffer of the proto-SCSI frame. This next buffer will similarly have a transmit descriptor associated with it unless the previous buffer's descriptor contained a "last" bit indicating that the buffer it pointed to contained the end of the proto-SCSI frame. After reading the received proto-SCSI frame, if none of the data contained within the frame is to be used further, then the buffers of the received frame should be returned to the transmit free buffers queue contained in the transmit control memory 122d by writing to the transmit return free buffers register associated with it.

To transmit an SMB frame, the host processor first obtains a pointer to a free SMB transmit buffer in transmit buffer memory 122c from the transmit free buffer queue contained in the transmit control memory 122d by reading from an associated register. In this buffer, the start of the SMB response frame can be constructed. The 32-bit connection identification and a 32-bit SMB transmit control field are placed before the SMB frame in the buffer. The SMB transmit control field includes a 24-bit frame byte count and a pre-pend header bit. If the pre-pend header bit is set, then after the connection identification and SMB transmit control field have been passed to the IP block, then the SMB header stored in the response info memory 103 will be automatically inserted.

To request the SMB transmit entity to transfer the SMB frame to the SMB entity, the host processor 1301 writes a buffer locator and buffer offset pair to the SMB transmit event queue 1325 by writing them to an associated transmit SMB transmit event register. The buffer locator contains a pointer to the buffer containing data for the SMB frame. The buffer offset contains an offset to the start of the data within the buffer and a length field. The buffer locator also contains a "last" bit to indicate whether further buffer locator/buffer offset pairs will be written containing pointers to more data for this SMB frame.

If the SMB frame is to include data from another SMB transmit buffer in buffer memory 122c, then the host processor 1301 must write another buffer locator/buffer offset pair describing this SMB transmit buffer to the SMB transmit event queue 1325. If the data to be included in the SMB frame straddles more than one SMB transmit buffer, then the SMB transmit entity can use the buffer pointers in the associated transmit buffer descriptor to link the data together. If the extra data is from a proto-SCSI receive frame, then these descriptors will have been filled in previously by the proto-SCSI receive entity.

Because data from SMB transmit buffers in transmit buffer memory 122c may be used for more than one SMB frame, then freeing up the SMB transmit buffers after they have been used is not a simple process. SMB transmit buffers that contain sections of a received proto-SCSI frame that are not involved in the SMB transmit can be freed by writing them back to the transmit free buffers queue contained in the transmit control memory via the associated transmit return free buffers register. SMB transmit buffers that contain data to be included in SMB frames cannot be freed in the same way, because these buffers cannot be freed until the data within them has been transmitted.

Consequently, after the buffer locator/buffer offset pairs to the various SMB frames which will contain the proto-SCSI data have been written to the SMB transmit event queue 1325, pointers to the original SMB transmit buffers are also written to the SMB transmit event queue 1325. These pointers are marked to indicate that they are to be freed back to the transmit free buffers queue. As the SMB transmit event queue 1325 is handled in sequence, then the SMB transmit buffers will only be freed after any data within them has been transmitted.

Figure 14:
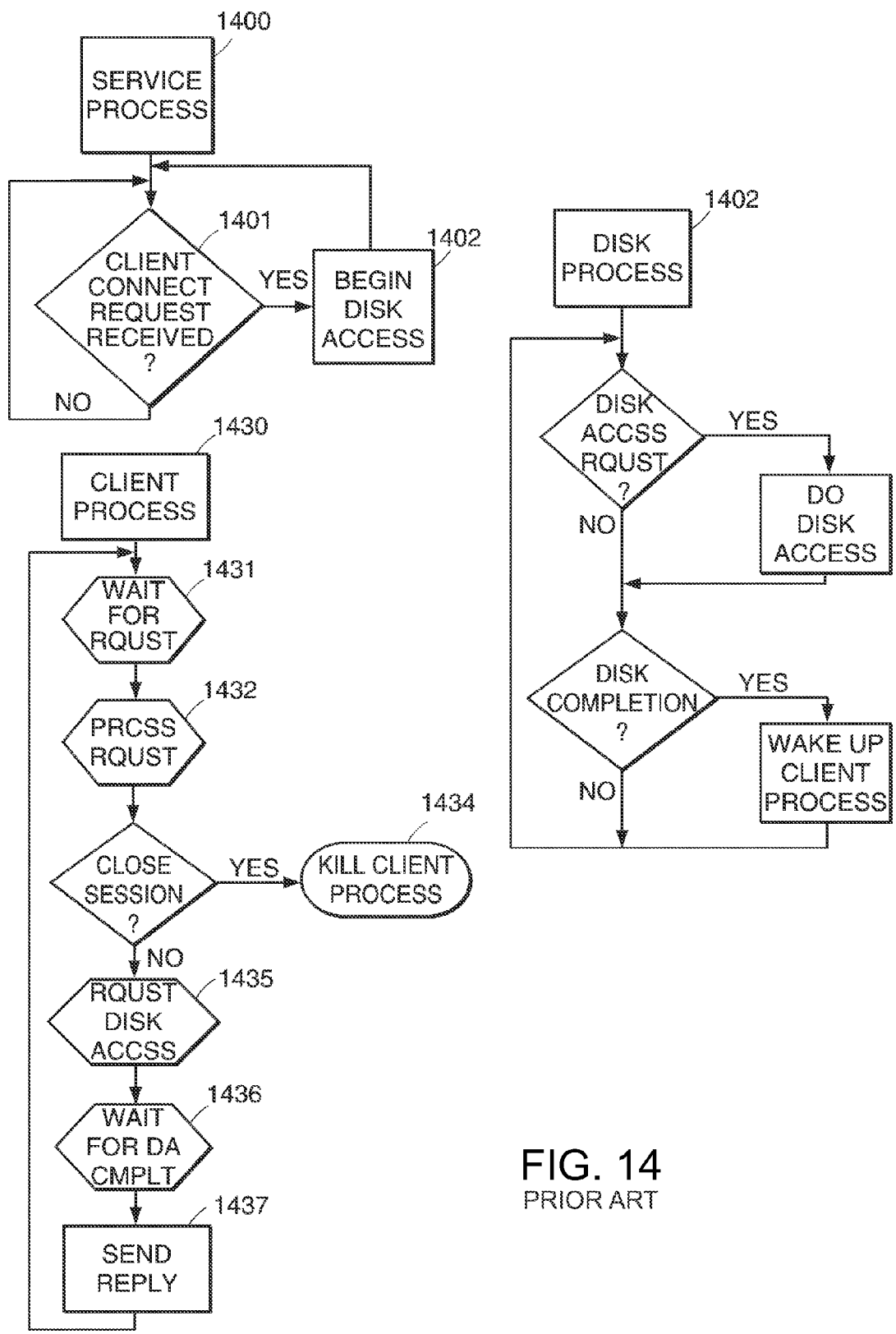
FIG. 14 is a flow chart representing a typical prior art approach, implemented in software, for handling multiple service requests as multiple threads.

FIG. 14 is a flow chart representing a typical prior art approach, implemented in software, for handling multiple service requests as multiple threads. In a traditional multiple-threaded architecture there is typically at least one thread to service each client. Threads are started and ended as clients attach and detach from the server. Each client may have a thread on the server to handle service requests and a thread to handle disk requests. The service process 1400 includes a repeated loop in which there is testing for the presence of a client connection request in box 1401; if the test is in the affirmative, the process initiates, in box 1402, the client process 1430. When the client process 1430 requires disk access, as in box 1435, it first requests the appropriate disk process to access the disk and then sleeps, in box 1436, until the disk access completes. The disk process 1402 then wakes up the client process 1430 to allow it to send the reply, in box 1437, to the client issuing the service request. Thus, there are at least two process switches for each client request requiring disk access. Implementing these multiple threaded processes in hardware poses problems because normally, they are handled by a multi-tasking operating system.

Figure 15:
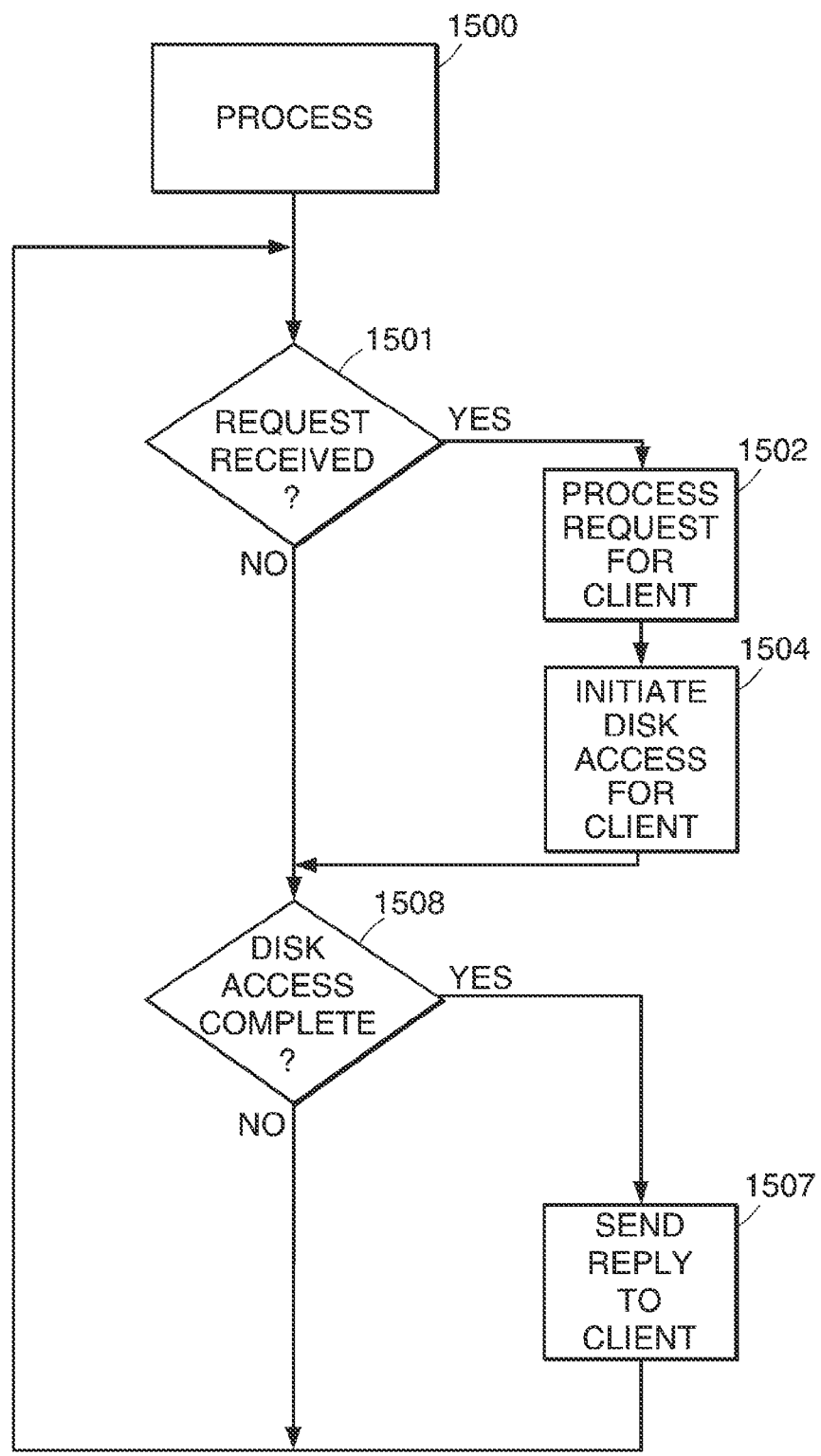
FIG. 15 is a flow chart showing the handling of multiple service requests, for use in connection with the service subsystem of FIG. 2 and, for example, the embodiments of FIGS. 12 and 13.

FIG. 15 is a flow chart showing the handling of multiple service requests in a single thread, for use in connection with the service subsystem of FIG. 2 and, for example, the embodiments of FIGS. 12 and 13. In the single-threaded architecture one service process 1500 handles requests from multiple clients in a single thread and one disk process 1502 handles all the requests from the service process 1500. The prior art approach of using a separate process for each client making a request has been eliminated and its function has been here handled by the single service process 1500. Additionally, these two processes, the service process and the disk process, may be contained within the same thread, as illustrated, or may be shared between two separate threads to facilitate load balancing.

The single-threaded service process of FIG. 15 can have disk requests from multiple clients outstanding simultaneously. The single thread includes a main loop with two tests. The first test, in box 1501, is whether a request has been received from a client. The second test, in box 1508, is whether a previously initiated disk access request has been completed. In consequence, as a disk access has been determined in box 1508 to have been completed, the service process in box 1507 will send the appropriate reply back to the client. Once the service process 1500 has handled a disk access request via box 1501 and has caused the request to be processed in box 1502, and caused, in box 1504, the initiation of a disk access, the service process is free to handle another request from another client via box 1501 without having to stop and wait for the previous disk access to complete. Upon a determination in box 1508 that the disk access has been completed, the disk process in box 1507 will inform the service process of the result, and the service process will send the response to the client. Thus the service and disk processes will be constantly running as long as there are requests being sent from clients.

FIG. 16 is a block diagram illustrating use of a file system module, such as illustrated in FIG. 3, in connection with a computer system having file storage. (An implementation analogous to that of FIG. 16 may be used to provide a storage module, such as illustrated in FIG. 3, in connection with a computer system having file storage.) In this embodiment, the file system module 1601 is integrated into a computer system, which includes microprocessor 1605, memory 1606, and a peripheral device, such as video 1609, as well as disk drive 1610, accessed via a disk subsystem 1602, which is here a conventional disk drive controller. The file system module 1601 is coupled to the disk subsystem 1602. The file system module 1601 is also coupled to the computer multiprocessor 1605 and the computer memory 1606 via the PCI bridge 1604 over the PCI bus 1607. The PCI bus 1607 also couples the microprocessor 1605 to the computer peripheral device 1609. The receive engine 1 of the file system module 1601 processes disk access requests from the microprocessor 1605 in a manner similar to that described above with respect to FIGS. 10, 11, 12B, and 13. Also the transmit engine if the file system module 1601 provides responses to disk access requests in a manner similar to that described above with respect to FIGS. 10, 11, 12B, and 13.

Figure 17A:
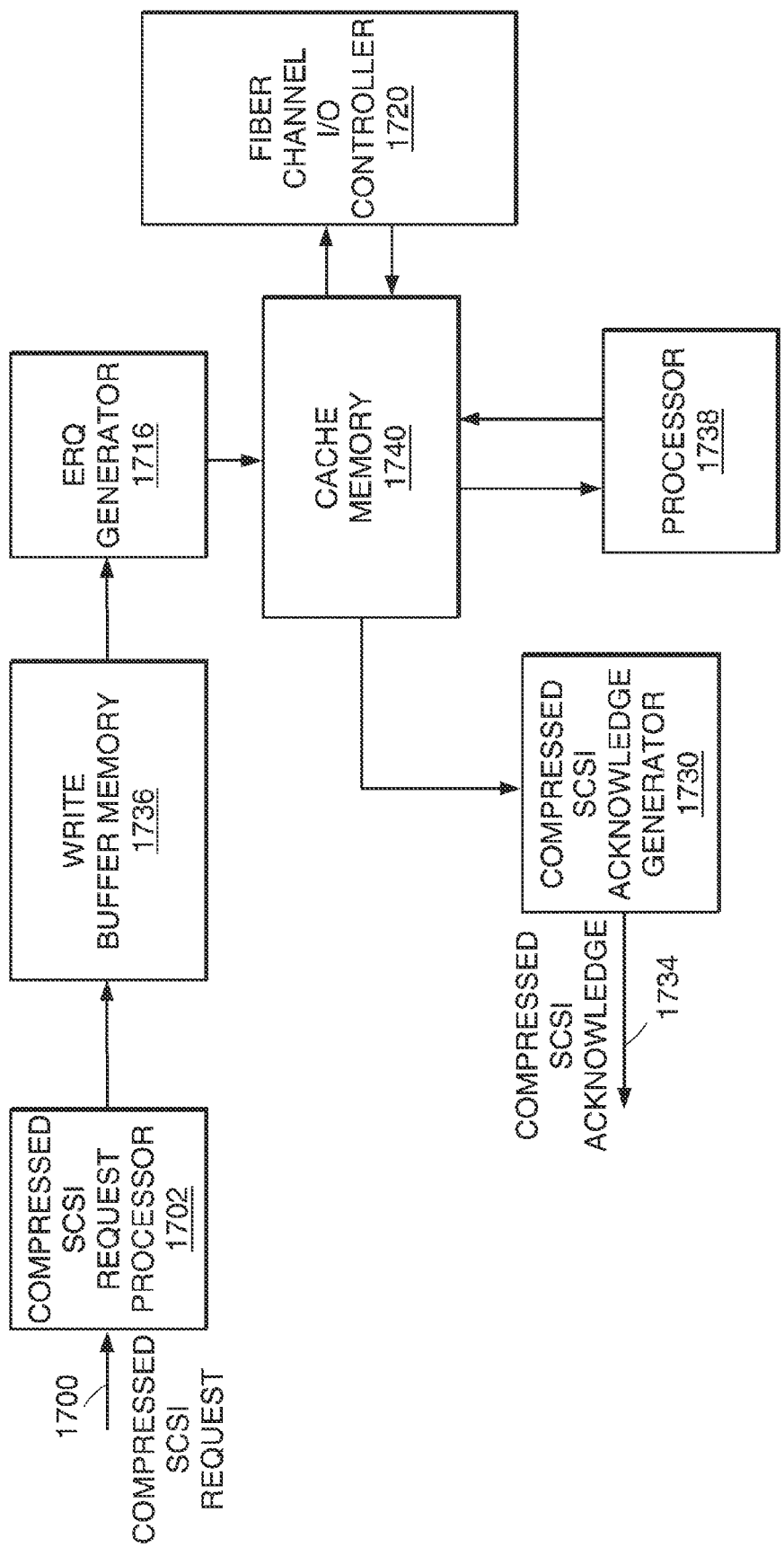
FIG. 17A is a block diagram of data flow in the storage module of FIG. 3.

FIG. 17A is a block diagram of data flow in the storage module of FIG. 3. It should be noted that while in FIGS. 17A and 17B a Tachyon XL fiber optic channel controller, available from Hewlett Packard Co., Palo Alto, Calif., has been used as the I/O device, embodiments of the present invention may equally use other I/O devices. Proto-SCSI requests are received over the proto-SCSI input 1700 by the proto-SCSI request processor 1702. The information relating to this request is stored in a SEST information table, and if the request is a WRITE request, then the WRITE data, which is also provided over the proto-SCSI input 1700, is stored in the WRITE buffer memory 1736.

The exchange request generator 1716 takes the information from the WRITE buffer memory 1736. If all the buffers to be written are currently cached, or the data to be written completely fill the buffers to be written, then the WRITE can be performed immediately. The data to be written is copied from WRITE buffer memory 1736 to the appropriate areas in the cache memory 1740. The Fiber Channel I/O controller 1720 is then configured to write the data to the appropriate region of disk storage that is in communication with the controller 1720. Otherwise a READ from the disk must be done before the WRITE to obtain the required data from the appropriate disk.

The proto-SCSI acknowledge generator 1730 is responsible for generating the proto-SCSI responses. There are three possible sources which can generate proto-SCSI responses, each of which supplies a SEST index: the processor 1738, Fiber Channel I/O controller 1720, and the cache memory 1740. For all transfers, an identification that allows the proto-SCSI request to be tied up with the acknowledge, along with status information, are returned the proto-SCSI acknowledge interface 1734.

Figure 17B:
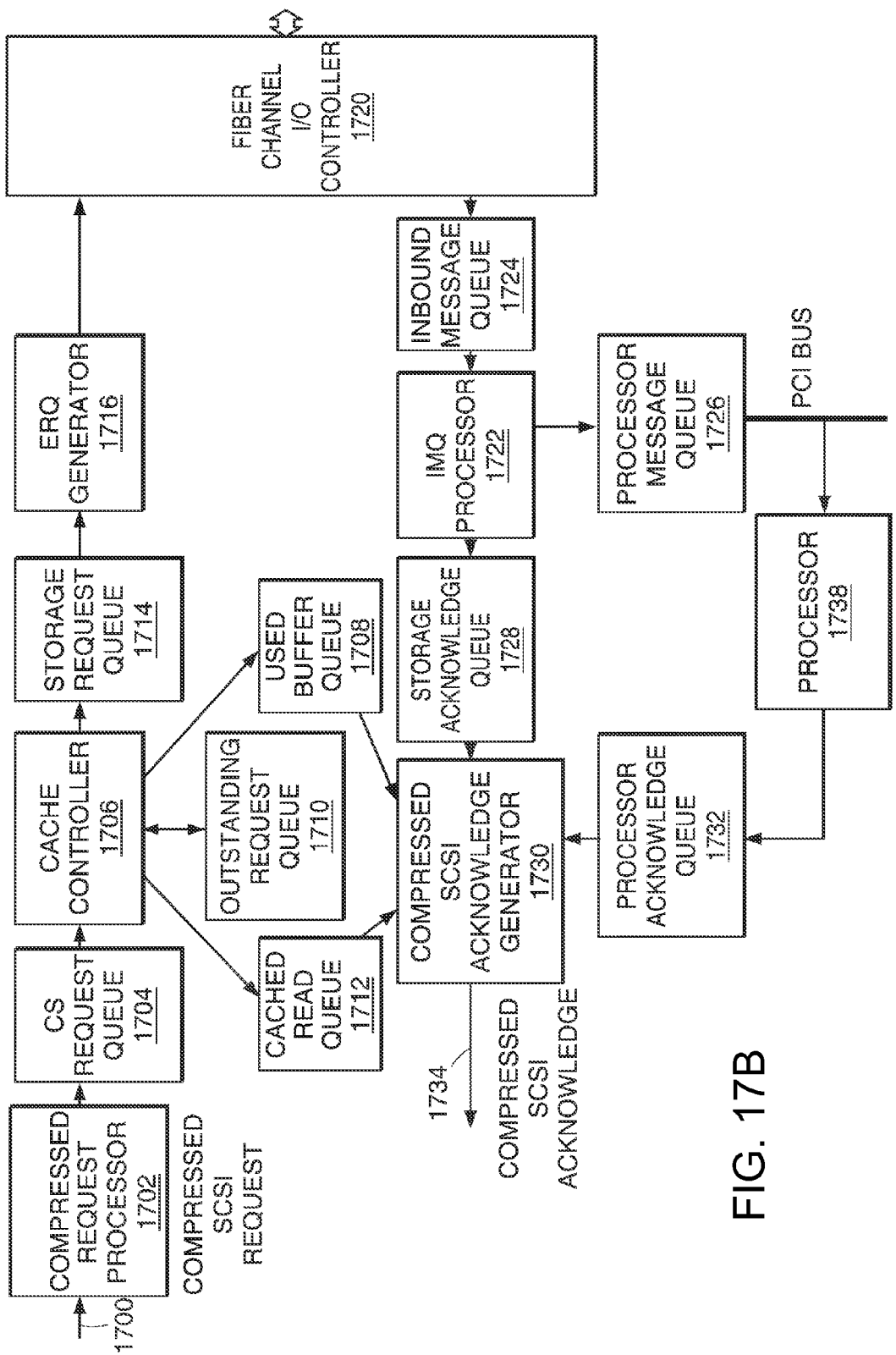
FIG. 17B is a block diagram of control flow in the storage module of FIG. 3.

FIG. 17B is a detailed block diagram showing control flow in the storage module of FIG. 3. When a proto-SCSI requests are received over the proto-SCSI input 1700 by the proto-SCSI request processor 1702, it is assigned a unique identifier (called the SEST index). The information relating to this request is stored in a SEST information table, and if this is a WRITE request, then the WRITE data, which is also provided on the proto-SCSI input 1700, is stored in the WRITE buffer memory 1736. The SEST index is then written into the proto-SCSI request queue 1704.

The cache controller 1706 takes entries out of the proto-SCSI request queue 1704 and the used buffer queue 1708. When an entry is taken out of the proto-SCSI request queue 1704, the information relating to this SEST index is read out of the SEST information table. The cache controller 1706 then works out which disk blocks are required for this transfer and translates this into cache buffer locations using a hash lookup of the disk block number and the disk device to be accessed. If any of the buffers in the write buffer memory 1736 required for this transfer are currently being used by other transfers, then the SEST index is put into the outstanding request queue 1710 to await completion of the other transfers. Otherwise, if this is a READ transfer and all of the required buffers are in the cache, then the SEST index is put into the cached READ queue 1712. Otherwise, the SEST index is written into the storage request queue 1714. A possible enhancement to this algorithm is to allow multiple READs of the same buffer to be in progress simultaneously, provided that the buffer is currently cached.

When an entry is taken out of the used buffer queue 1708, a check is made as to whether any requests were waiting for this buffer to become available. This is done by searching through the outstanding request queue 1710, starting with the oldest requests. If a request is found that was waiting for this buffer to become available, then the buffer is allocated to that request. If the request has all the buffers required for this transfer, then the SEST index is written into the storage request queue 1714 and this request is removed from the outstanding request queue 1710. Otherwise the request is left in the outstanding request queue 1710.

The exchange request generator 1716 takes entries out of the storage request queue 1714 and the partial WRITE queue (not shown). When a SEST index is read out of either queue then the information relating to this SEST index is read out of the SEST information table. If it is a READ transfer then the Fiber Channel I/O controller 1720 is configured to read the data from the appropriate disk. If it is a WRITE transfer and all the buffers to be written are currently cached, or the data to be written completely fills the buffers to be written, then the WRITE can be performed immediately. The data that is to be written is copied from WRITE buffer memory 1736 to the appropriate areas in the cache buffers. The Fiber Channel I/O controller 1720 is then configured to write the data to the appropriate disk. Otherwise, as mentioned above with respect to FIG. 17A, it is necessary to do a READ from the disk before we do a WRITE and initiate a READ of the required data from the appropriate disk.

The IMQ processor 1722 takes messages from the inbound message queue 1724. This is a queue of transfers which the Fiber Channel I/O controller 1720 has completed or transfers which have encountered a problem. If there was a problem with the Fiber Channel transfer then the IMQ processor 1722 will pass a message on to the processor via the processor message queue 1726 to allow it to do the appropriate error recovery. If the transfer was acceptable, then the SEST information is read out for this SEST index. If this transfer was a READ transfer at the start of a WRITE transfer, then the SEST index is written into the partial WRITE queue. Otherwise, it is written into the storage acknowledge queue 1728.

As mentioned with respect to FIG. 17A, the proto-SCSI acknowledge generator 1730 is responsible for generating the proto-SCSI responses. Again, there are three possible sources that can generate proto-SCSI responses, each of which supplies a SEST index. The processor acknowledge queue 1732 is used by the processor 1738 to pass requests that generated errors and that had to be sorted out by the processor 1738 and sent back to the hardware once they have been sorted out. The storage acknowledge queue 1728 is used to pass back Fiber Channel requests which have completed normally. The cached READ queue 1712 is used to pass back requests when all the READ data required is already in the cache and no Fiber Channel accesses are required.

When there is an entry in any of these queues, the SEST index is read out. The SEST information for this index is then read. For all transfers, an identification that allows the proto-SCSI request to be tied up with the acknowledge, along with status information, is returned across the proto-SCSI acknowledge interface 1734. For a READ request, the read data is also returned across the proto-SCSI acknowledge interface 1734. Once the proto-SCSI transfer has been completed, the addresses of all the buffers associated with this transfer are written into the used buffer queue 1708. Any WRITE buffer memory used in this transfer is also returned to the pool of free WRITE buffer memory.

Figure 18:
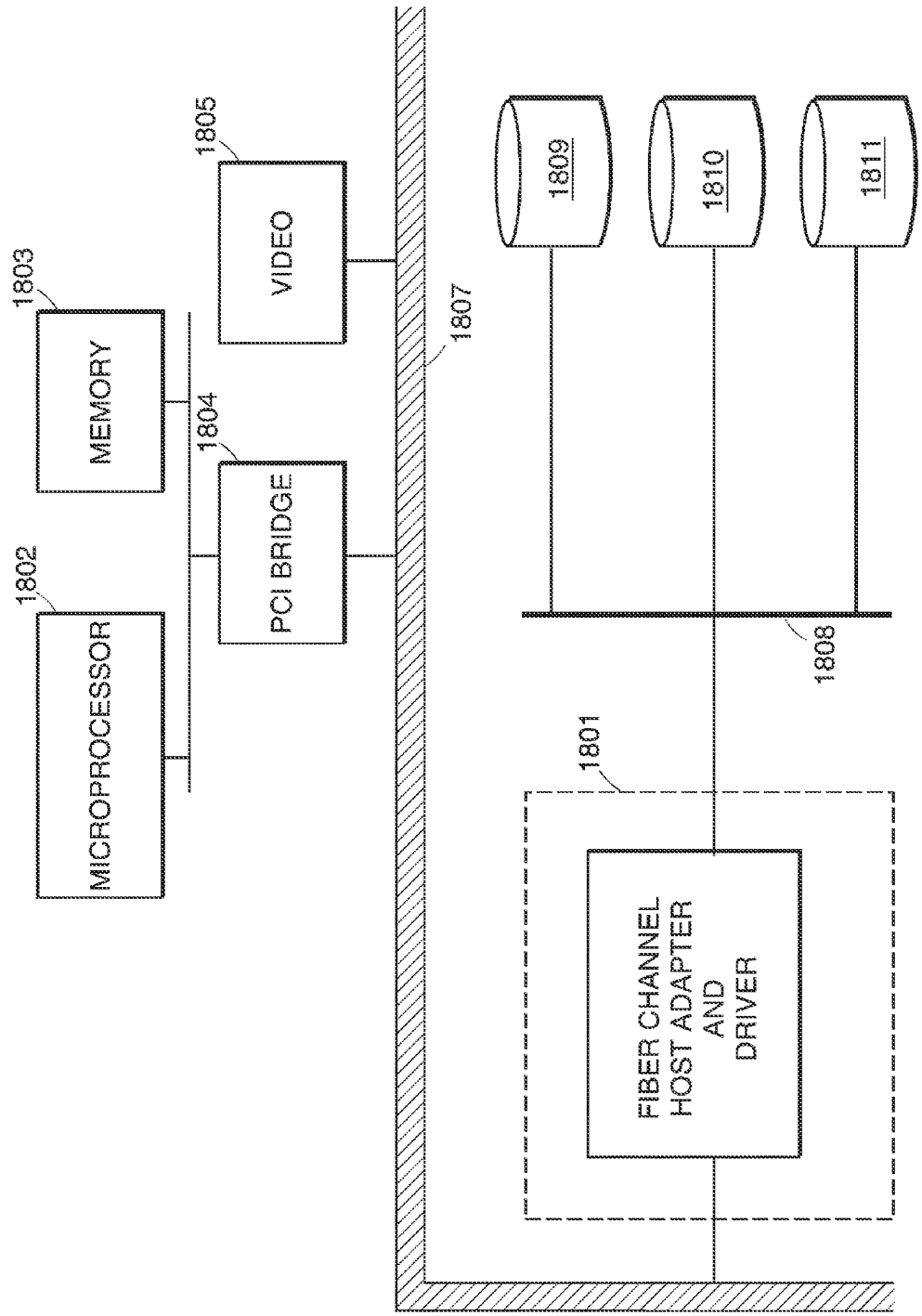
FIG. 18 is a block diagram illustrating use of a storage module, such as illustrated in FIG. 3, in connection with a computer system having file storage.

FIG. 18 is a block diagram illustrating use of a storage module, such as illustrated in FIG. 3, in connection with a computer system having file storage. Here the storage module 1801 acts as a fiber channel host bus adapter and driver for the computer system, which includes microprocessor 1802, memory 1803, a peripheral device, such as a video system 1805, and storage devices 1809, 1810, and 1811. The storage module 1801 is coupled to the microprocessor 1802 and the computer memory 1803 via the PCI bridge 1804 over PCI bus 1807. The storage module 1801 receives requests from the PCI bus and processes the requests in the manner described above with respect to FIGS. 17A and 17B. The storage module 1801 accesses the storage devices 1809, 1810, and 1811 via the storage device access interface 1808.

Figure 19:
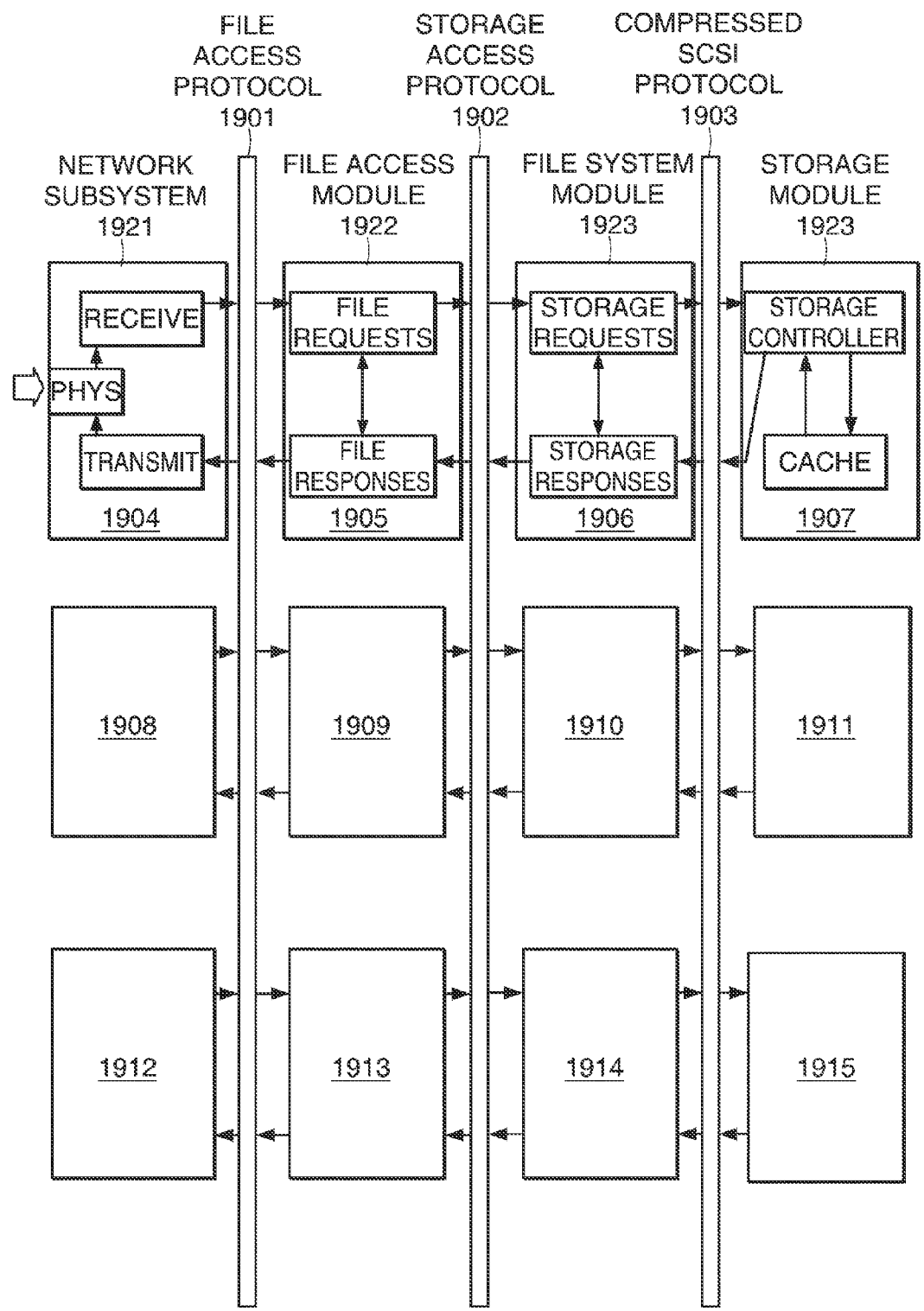
FIG. 19 is a block diagram illustrating scalability of embodiments of the present invention, and, in particular, an embodiment wherein a plurality of network subsystems and service subsystems are employed utilizing expansion switches for communication among ports of successive subsystems and/or modules.

FIG. 19 is a block diagram illustrating scalability of embodiments of the present invention, and, in particular, an embodiment wherein a plurality of network subsystems and service subsystems are employed utilizing expansion switches for establishing communication among ports of successive subsystems and/or modules. To allow extra network connections, to increase the bandwidth capabilities of the unit, and to support a larger number of storage elements, in this embodiment, expansion switches 1901, 1902, 1903 are used to interface a number of modules together. The expansion switch routes any connection from a module on one side of the expansion switch to any module on the other side. The expansion switch is non-blocking, and may be controlled by an intelligent expansion switch control module that takes in a number of inputs and decides upon the best route for a particular connection.

In the embodiment of FIG. 19, the overall system shown utilizes a plurality of network subsystems shown in column 1921 including network subsystem 1904 and similar subsystems 1908 and 1912. The are also a plurality of service subsystems, which are here realized as a combination of file access modules (in column 1922), file system modules (in column 1923), and storage modules (in column 1924). Between each column of modules (and between the network subsystems column 1921 and the file access modules column 1922) is a switch arrangement, implemented as the file access protocol expansion switch 1901, the storage access expansion switch 1902, and the proto-SCSI protocol expansion switch 1903. At the file access protocol level, the expansion switch 1901 dynamically allocates incoming network connections from the network subsystem 1904 to particular file access modules 1905 depending on relevant criteria, including the existing workload of each of the file access modules 1905.

At the storage access protocol level, the expansion switch 1902 dynamically allocates incoming file access connections from the file access modules 1905 to particular file system modules 1906 depending on relevant criteria, including the existing workload of the file system modules 1906. At the proto-SCSI protocol level, the expansion switch 1903 dynamically allocates incoming file system connections to particular storage modules 1907 depending on relevant criteria, including the physical location of the storage element.

Alternatively, the items 1901, 1902, and 1903 may be implemented as buses, in which case each module in a column that accepts an input signal communicates with other modules in the column to prevent duplicate processing of the signal, thereby freeing the other modules to handle other signals. Regardless of whether the items 1901, 1902, and 1903 are realized as buses or switches, it is within the scope of the present invention to track the signal processing path through the system, so that when a response to a file request is involved, the appropriate header information from the corresponding request is available to permit convenient formatting of the response header.

Figure 20:
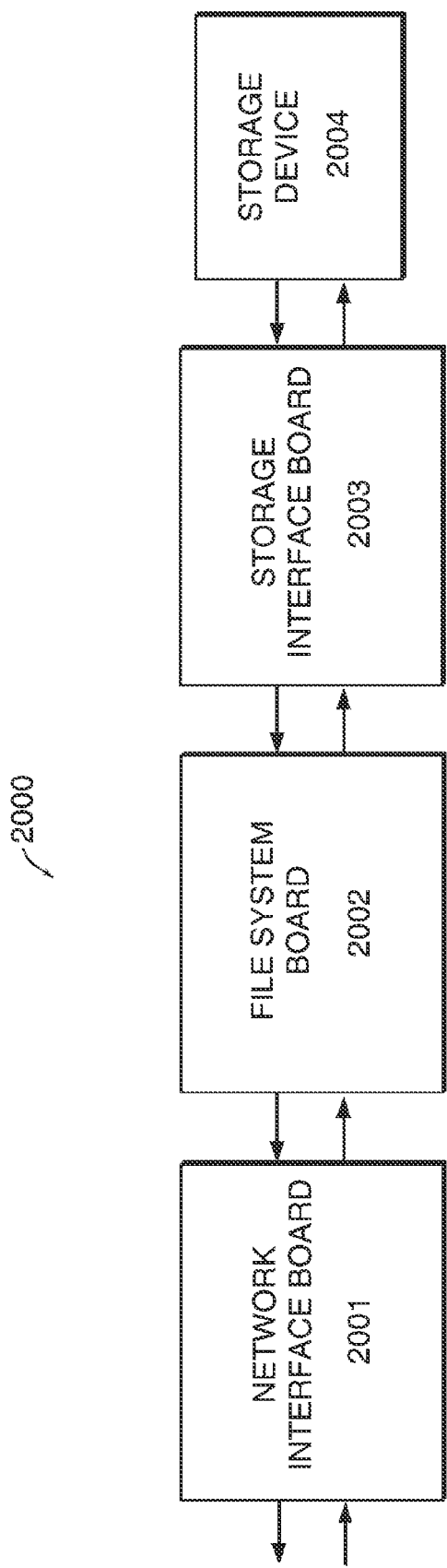
FIG. 20 is a block diagram illustrating a hardware implemented storage system in accordance with an embodiment of the present invention.

FIG. 20 is a block diagram illustrating a hardware implemented storage system in accordance with a further embodiment of the invention. The storage system 2000 includes a network interface board (sometimes called "NIB") 2001, a file system board (sometimes called "FSB") 2002 and a storage interface board (sometimes called "SIB") 2003. The network interface board 2001 implements the network module 31 of FIG. 3 and is in two-way communication with a computer network. The file system board 2002 implements the service module 33 and file system module 34 of FIG. 3. The storage interface board 2003 implements the storage module 35 of FIG. 3. The storage interface board 2003 is in two-way communication with a one or more storage devices 2004.

The network interface board 2001 handles the interface to a Gigabit Ethernet network and runs all the lower level protocols, principally IP, TCP, UDP, Netbios, RPC. It is also responsible for general system management, including the running of a web based management interface. (The storage system 2000 includes a number of parameters that can be modified and a number of statistics that can be monitored. The system 2000 provides a number of methods to access these parameters and statistics. One such method includes connecting to a server associated with the system 2000 remotely, via a Telnet session. Another method includes connecting to a server associated with the system 2000 via a web browser. Thus, a web based management interface process runs on the network interface board's processor to provide the "web site" for a client web browser to access. Other methods to access the above mentioned parameters and statistics may also be used.)

The file system board 2002 runs the key protocols (principally NFS, CIFS and FTP) and also implements an on-disk file system and a file system metadata cache. The storage interface board 2003 handles the interface to a Fibre Channel attached storage and implements a sector cache.

In accordance with the embodiment of FIG. 20, each board has a its own processor as well as a large portion of a dedicated, very large scale integrated circuit ("VLSI") resource in the form of one or more field programmable gate arrays ("FPGA"s). All the processors and all the VLSI blocks have their own dedicated memories of various sizes. In this embodiment, Altera 10K200 FPGAs and Altera 20K600 FPGAs are used. The logic within the FPGAs was designed using the Hardware Description Language VHDL (IEEE- STD 1076-1993) and then compiled to achieve the structures illustrated in FIG. 3 and following.

The boards 2001, 2002, and 2003 of FIG. 20 are coupled to one another with an inter-board "fast-path." The fast-path between any pair of boards consists of two separate connections; one for transmit functions and one for receive functions. The bandwidth of each of these connections is 1280 Mbps. For low bandwidth inter-board communication (for example for certain management tasks) all three boards are also interconnected with a high speed serial connection that runs at 1.5 Mbps.

The essential task of the storage system 2000 is to maintain an on-disk file system and to allow access to that file system via a number of key protocols, principally NFS, CIFS and FTP. Typical operation of the storage system 2000 consists of receiving a CIFS/NFS/FTP request from a client over the ethernet, processing the request, generating the required response and then transmitting that response back to the client.

The Network Interface Board

All network transmit and receive activity is ultimately handled by a gigabit ethernet MAC chip which is connected to the VLSI. Consequently, all packets, at some level, pass through the VLSI. During a receive operation, a packet may be handled entirely by the VLSI (for example, if it is a TCP packet on an established connection) or the VLSI may decide to pass it to the processor for further handling (for example, if it is an ARP packet or a TCP SYN packet).

During a transmit operation, a packet may be handled entirely by the VLSI (for example, if a data transmit request for an established TCP connection has been received from the fast-path) or the packet may be handled by the processor.

In order to process a TCP packet, the network interface board must first establish a TCP connection. Establishing a TCP connection involves the network interface board processor. Once the TCP connection has been established, all subsequent TCP activity on the connection is handled in the VLSI until the connection needs to be closed. The network interface board processor is also involved when the connection is closed. Once the TCP connection has been established, incoming packets are received and processed. The VLSI extracts the TCP payload bytes from each packet. If this is a "plain" TCP connection (used by FTP) then these bytes are immediately passed across the fast-path to the file system board 2002. For Netbios and RPC connections (used by CIFS and NFS respectively) the VLSI reassembles these payload bytes until a complete Netbios or RPC message has been received. At this point, the complete message is pushed across the fast-path by the network interface board 2001 to the file system board 2002.

Typically, the Netbios or RPC message will be a complete CIFS or NFS request. The file system board 2002 processes this as required and then generates a response, which it passes back to the network interface board 2001 via the fast-path. The VLSI then transmits this response back to the client.

The VLSI handles all required TCP functions for both receive and transmit operations, for example, the VLSI generates acknowledgements, measures rtt, re-transmits lost packets, follows the congestion avoidance algorithms, etc. However, all IP layer de-fragmentation encountered during a receive operation requires the involvement of the network interface board processor.

The network interface board 2001 is capable of supporting 65000 simultaneous TCP connections. However, it should be noted that this is an upper limit only, and in practice the number of simultaneous connections that can be supported for any particular higher level protocol (CIFS, FTP, etc.) are likely to be limited by restrictions elsewhere in the system. For example, the amount of memory available for connection specific information on the file system board 2002 may limit the number of simultaneous connection that can be supported.

The network interface board processor is also involved in processing a user datagram protocol packet ("UDP" packet). The network interface board processor handles every received UDP packet. When a UDP packet is received, the network interface board processor is notified. The processor then examines enough of the relevant headers to determine what action is required. One situation of interest occurs when the Network File System operating system, developed by Sun Microsystems, Inc., ("NFS") operates over UDP. In such a situation, the network interface board processor will wait until sufficient UDP packets have been received to form a complete NFS request (this will usually be only one packet, the exception typically being a write request). The processor will then issue a command to the hardware, which will cause the complete NFS request to be passed across the fast-path to the file system board 2002. The file system board 2002 processes this as required and then generates a response that it passes back to the network interface board via the fast-path. The VLSI transmits this response back to the client. For UDP transmit operations the VLSI handles all the required functions. For UDP receive operations the VLSI handles all data movement and checksum verification. However, the header processing on a receive is operation is handled by the network interface board processor as outlined above.

In order to process a File Transfer Protocol ("FTP") operation, each FTP client opens a TCP connection for controlling transfers. For each "put" or "get" request sent on the control connection, a new TCP connection is opened to transfer the data. Clients do not request multiple transfers concurrently, so the maximum number of TCP connections used concurrently is two per client. Each "put" or "get" request causes the data connection to be established, and then the data is received or transmitted by the system 2000. The data transfer rates depend on two factors: 1) the TCP transfer rate; and 2) the disc read/write transfer rate. If data is received from TCP faster than it can be written to disc, then TCP flow control is used to limit the transfer rate as required.

Typically, the client's TCP receive window is used to regulate data transfer to the client. Consequently, TCP transfer rates also depend on the TCP window size (the storage system 2000 uses 32120 for receive window), round trip time (the time taken to receive an acknowledgement for transmitted data), and the packet loss rate. Further, in this embodiment, there are 128 MBytes of receive buffer memory and 128 MBytes of transmit buffer memory. If the receive buffer memory becomes full, receive packets will be dropped. Similarly, if the transmit buffer memory becomes full, the network interface board 2001 will stop accepting data from the file system board 2002.

The File System Board

The file system board 2002 has effectively three separate sections: the file system receive module, the file system transmit module, and the file system copy module. Each section contains separate data paths, separate control memory and separate buffer memory. The only shared resource is the host processor, which can access all areas.

Figure 21:
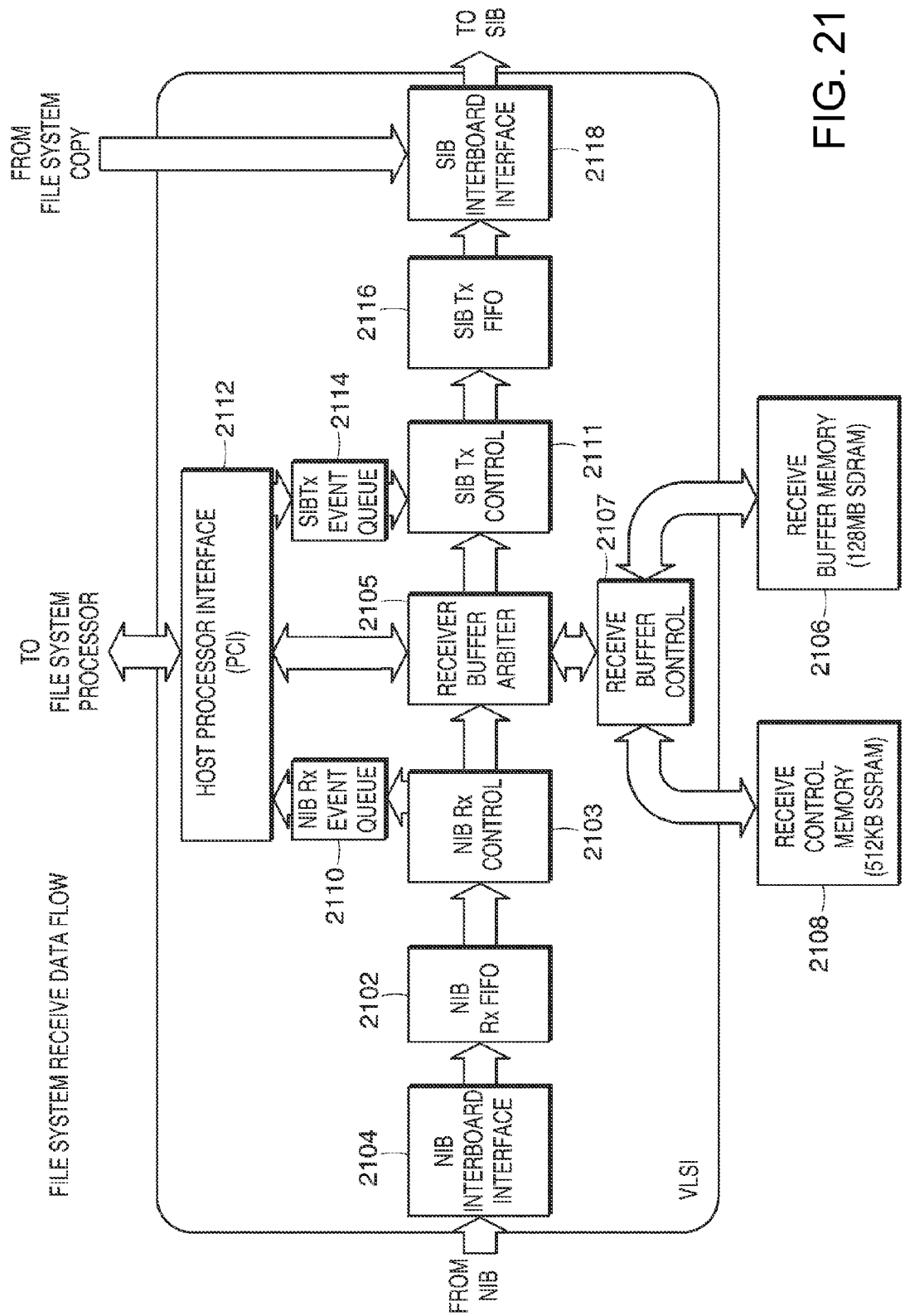
FIG. 21 is a block diagram illustrating data flow associated with the file system receive module of the embodiment of FIG. 20.

FIG. 21 is a block diagram illustrating the data flow associated with the file system module of the embodiment of FIG. 20. The file system receive of this embodiment is analogous to the receive aspect of embodiment of FIG. 13. The file system receive module receives data from the network interface board 2001 via the network interface board inter-board interface 2104 and transmits data to the storage interface board 2003. Incoming data frames from the network interface board 2001 are transmitted to a receive buffer arbiter 2105 via the "file system receive" network interface board receive FIFO 2102 and network interface board receive control block 2103. The frames are written into free buffers in the file system receive buffer memory 2106, via the receive buffer arbiter 2105 and the receive buffer control block 2107.

The receive buffer arbiter 2105 decides which of multiple requests which may be received will be allowed to access the file system receive buffer memory 2106. The receive buffer control block 2107 provides a link function to link multiple buffers together when a request straddles more than one buffer. The file system receive buffers are 2 KBytes long, thus one incoming frame may straddle a number of receive buffers. As frames are written into file system receive buffer memory 2106, receive buffer descriptors are updated in the file system receive control memory 2108.

When a complete frame has been written to the file system receive buffer memory 2106, an entry is written to the network interface board receive event queue 2110 (which exists as a linked list in the file system receive control memory 2108) and an interrupt to the host processor is generated. The host processor, through the host processor interface 2112, reads the entry in the network interface board receive event queue 2110. From the information contained in the network interface receive event buffer locator (which is read from the queue 2110), the host processor determines the address of the first buffer of the frame in the file system receive buffer memory 2106. The host processor will then use DMA to transmit the file protocol header from the file system receive buffer memory 2106 into the host processor's local memory. Once the host processor has analyzed the file protocol request, one or more of the following actions may be taken:

1) If the request is a write request, a storage interface request header is constructed in file system receive buffer memory 2106. A buffer locator and buffer offset pair for this header is written to the storage interface board transmit event queue 2114. A buffer locator and buffer offset pair for the write data (which is still held in file system receive buffer memory 2106) is also written to the storage interface board transmit event queue 2114.

2) A storage interface request frame will be constructed in the file system receive buffer memory 2106. The request is queued to be sent by writing a buffer locator and buffer offset pair to the storage interface board transmit event queue 2114.

Figure 22:
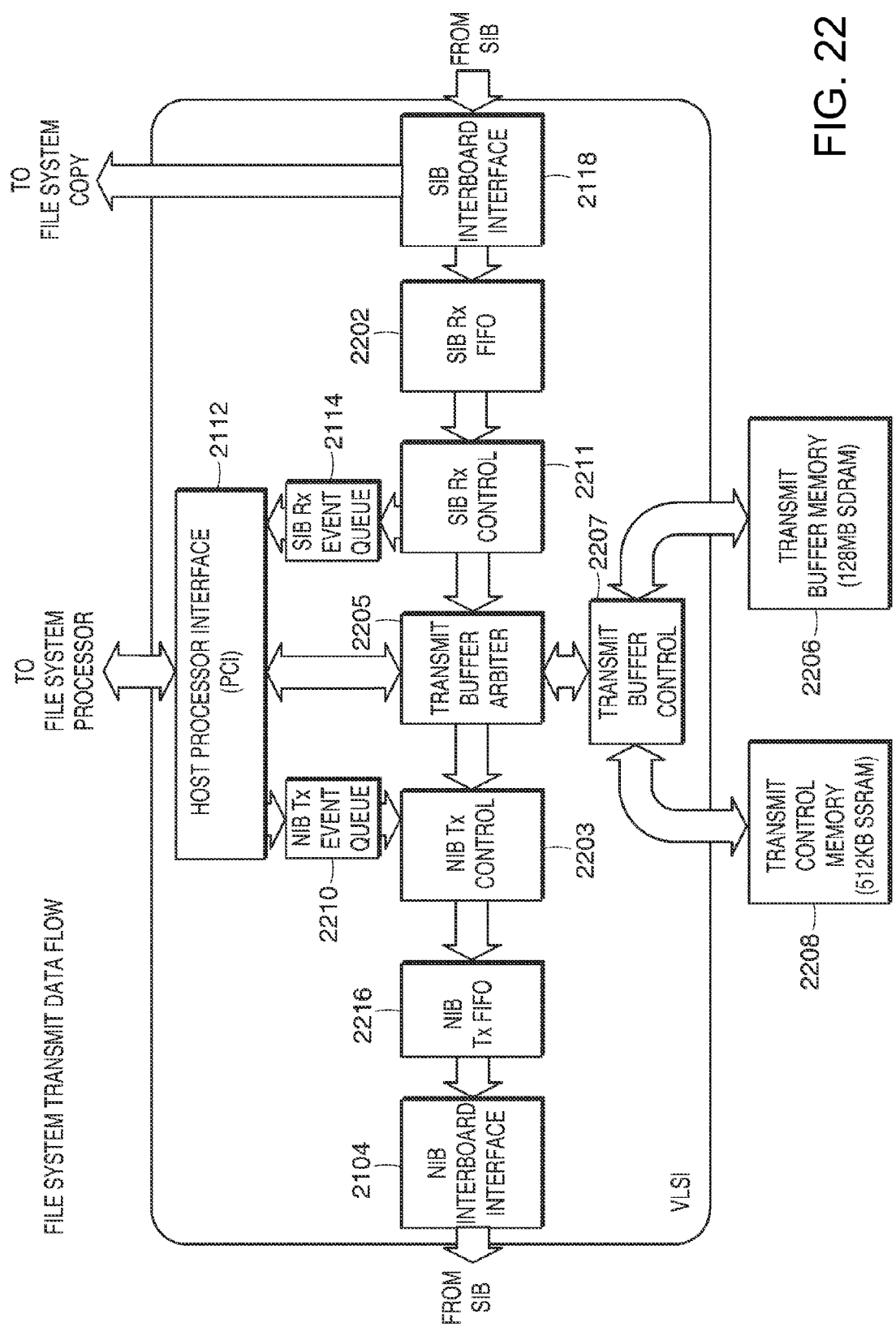
FIG. 22 is a block diagram illustrating data flow associated with the file system transmit module of the embodiment of FIG. 20.

3) A file protocol response frame will be constructed in the file system transmit buffer memory 2206 shown in FIG. 22. The request is queued to send by writing a buffer locator and buffer offset pair to the network interface board transmit event queue 2210. Receive buffers that are no longer required are returned to the free buffers queue by writing their buffer locators to the return free buffers register.

The storage interface transmit process is driven by the storage interface board transmit event queue 2114. Entries in the storage interface board transmit event queue 2114 are read automatically by the hardware process. The entries consist of buffer locator and buffer offset pairs which provide enough information for a storage interface request frame to be constructed from fragments in the receive buffer memory 2106. Data is read from receive buffer memory 2106, aligned as necessary and transferred into the storage interface board transmit FIFO 2116 via the storage interface board transmit control block 2111.

When data is present in the storage interface board transmit FIFO 2116, a request is made to the storage interface board, via the storage interface board inter-board interface 2118, to transmit a storage interface request. The storage interface block will only allow transmission when it has enough resource to handle the request. When data from buffers has been transferred into the storage interface board transmit FIFO 2116, the buffers are freed back into the free buffers queue. The storage interface transmit process can forward storage interface requests from the storage interface copy process shown in FIG. 23. Requests from the copy process have highest priority.

The file system receive buffer memory 2106 contains 65536 receive buffers. The receive control memory 2108 contains 65536 receive descriptors. Thus, 128 Mbytes of data from the network interface block 2001 can be buffered here.

The network interface board receive event queue 2110 and the storage interface board transmit event queue 2114 can both contain 32768 entries. One incoming file protocol request will typically require two entries in the receive queue 2110, limiting the number of buffered requests to 16384. If the receive queue 2110 becomes full, no more incoming requests will be accepted from the network interface board 2001. A storage interface request will typically require up to four entries in the transmit queue 2114, limiting the number of buffered requests to 8192. When the transmit queue 2114 becomes full, the host processor will stall filling the queue but will be able to continue with other actions.

In summary the limits are: 128 MBytes of data buffering, approximately queuing for 16384 incoming file protocol requests and approximately queuing for 8192 storage interface requests. Data from the network interface board 2001 is only accepted if there are resources within this section to store a maximum length frame of 128 KBytes. Thus when this buffer space is exhausted or the receive queue 2110 becomes full, the network interface board 2001 will be unable to forward its received frames.

FIG. 22 is a block diagram illustrating data flow associated with the file system transmit module of the embodiment of FIG. 20. The file system transmit of this embodiment is analogous to the transmit aspect of embodiment of FIG. 13. This file system transmit module receives data from the storage interface board 2003 via the storage interface board inter-board interface 2118 and transmits data to the network interface board 2001.

Incoming non-file system copy responses from the storage interface board are transmitted to a transmit buffer arbiter 2205 via the "file system transmit" storage interface board receive FIFO 2202 and the storage interface board receive control block 2211. The non-file system copy responses are written into free buffers in the file system transmit buffer memory 2206 via the transmit buffer arbiter 2205 and the transmit buffer control block 2207. (The transmit buffer arbiter 2205 and transmit buffer control block 2207 provide functions similar to those provided by the receive buffer arbiter 2105 and the receive buffer control block 2107.) The transmit buffers are 2 KBytes long and thus one incoming frame may straddle a number of transmit buffers. As responses are written into transmit buffer memory 2206, transmit buffer descriptors are updated in the transmit control memory 2208.

When a complete response has been written to the transmit buffer memory 2206, an entry is written to the storage interface board receive event queue 2214 (which exists as a linked list in the transmit control memory 2208) and an interrupt to the host processor is generated via the host processor interface 2112.

The host processor reads the entry in the storage interface board receive event queue 2214. From the information contained in the storage interface receive event buffer locator (which is read from the queue 2214), the host processor determines the address of the first buffer of the response in the transmit buffer memory 2206. The host processor will then DMA the response header from the transmit buffer memory 2206 into its local memory. Once the host processor has analysed the response, one or more of the following actions may be taken:

1) If the request is a read request, a file protocol response header is constructed in the transmit buffer memory 2206. A buffer locator and buffer offset pair for this header are written to the network interface board transmit event queue 2210. A buffer locator and buffer offset pair for the read data (which is still held in transmit buffer memory 2206) are written to the network interface transmit event queue.

2) A file protocol response frame is constructed in transmit buffer memory 2206. The request is queued to send by writing a buffer locator and buffer offset pair to the network interface transmit event queue 2210.

3) Transmit buffers that are no longer required are returned to the free buffers queue by writing their buffer locators to the return free buffers register.

The network interface transmit process is driven by the network interface board transmit event queue 2210. Entries in the queue 2210 are read automatically by the hardware process. The entries consist of buffer locator and buffer offset pairs which provide enough information for a file protocol response frame to be constructed from fragments in the transmit buffer memory 2206. Data is read from transmit buffer memory 2206, aligned as necessary and transferred into the network interface board transmit FIFO 2216 via the network interface board transmit control block 2203.

When data is present in the network interface board transmit FIFO 2216, a request is made to the network interface board 2001 via the network interface board inter-board interface 2104 to transmit a network interface request. The network interface block 2001 will only allow transmission when it has enough resource to handle the request. When data from buffers has been transferred into the transmit FIFO 2216, the buffers are freed back into the free buffers queue.

The file system transmit buffer memory 2206 contains 65536 transmit buffers. The transmit control memory 2208 contains 65536 transmit descriptors. Thus 128 Mbytes of data from the storage interface bock 2003 can be buffered here. The storage interface receive event queue 2214 and the network interface transmit event queue 2210 can both contain 32768 entries. One incoming storage interface response will typically require two entries in the receive queue 2214, limiting the number of buffered requests to 16384. If the receive queue 2214 becomes full, no more incoming requests will be accepted from the storage interface board 2003. A network interface request will typically require up to four entries in the transmit queue 2210, limiting the number of buffered requests to 8192. When the transmit queue 2210 becomes full, the host processor will stall filling the queue but will be able to continue with other actions.

In summary the limits are: 128 MBytes of data buffering, approximately queuing for 16384 incoming storage interface responses and approximately queuing for 8192 file protocol responses. Data from the storage interface board 2003 is only accepted if there are resources within this section to store a maximum length response of 128 KBytes. Thus when this buffer space is exhausted or the receive queue 2214 becomes full, the storage interface board 2003 will be unable to forward its responses.

Figure 23:
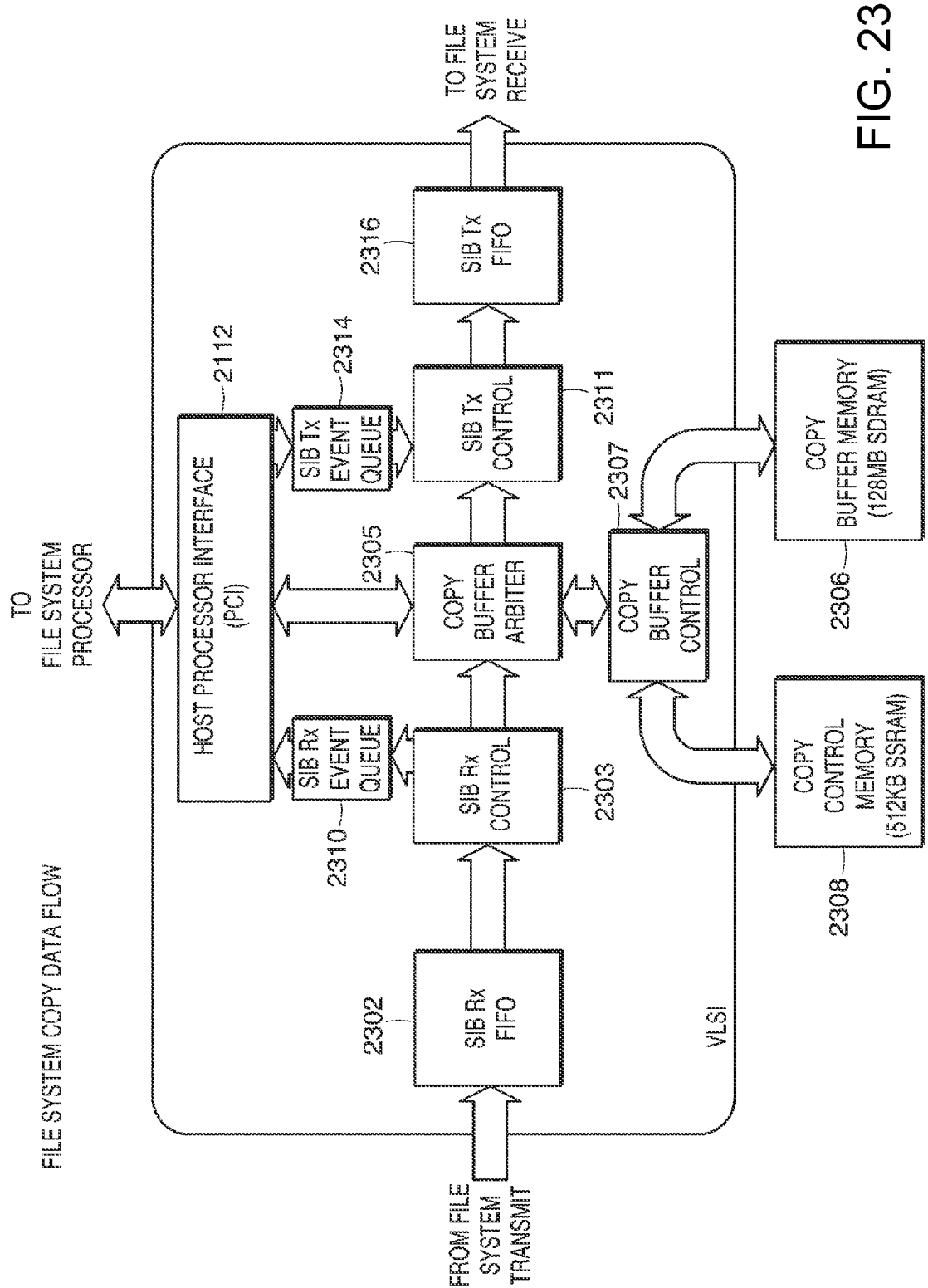
FIG. 23 is a block diagram illustrating data flow associated with the file system copy module of the embodiment of FIG. 20.

FIG. 23 is a block diagram illustrating data flow associated with the file system copy module of the embodiment of FIG. 21. This file system copy module receives data from the storage interface board 2003 and retransmits the data back to the storage interface board 2003.

Incoming file system copy responses from the storage interface board 2003 are transmitted to a copy buffer arbiter 2305 via the "file system copy" storage interface board copy receive FIFO 2302 and the storage interface board copy receive control block 2303. The file system copy responses are written into free buffers in the file system copy buffer memory 2306, via the copy buffer arbiter 2305 and the copy buffer control block 2307. Again, the copy buffer arbiter 2305 and the copy buffer control block 2307 provide functions similar to those provided by the receive and transmit buffer arbiters 2105 and 2205 and the receive and transmit buffer control blocks 2107 and 2207. The copy buffers are 2 KBytes long and thus one incoming response may straddle a number of copy buffers.

As responses are written into copy buffer memory 2306, copy buffer descriptors are updated in the copy control memory 2308. When a complete response has been written to the copy buffer memory 2306, an entry is written to the storage interface board copy receive event queue 2310 (which exists as a linked list in the copy control memory 2306) and an interrupt to the host processor is generated.

A storage interface request frame is constructed in the copy buffer memory 2306. The request is queued to be sent by writing a buffer locator and buffer offset pair to the storage interface board copy transmit event queue 2314. When the response is received, the host processor reads the entry from the storage interface board copy receive event queue 2310. From the information contained in the copy receive event buffer locator (which is read from the queue 2310), the host processor determines the address of the first buffer of the response in the copy buffer memory 2306. The host processor can then DMA the response header from the copy buffer memory 2306 into its local memory. Once the host processor has analyzed the response, it can modify the header to the appropriate storage interface request. The request is queued to be sent by writing a buffer locator and buffer offset pair to the storage interface board copy transmit event queue 2314.

The copy transmit process is driven by the copy transmit event queue 2314. Entries in the queue 2314 are read automatically by the hardware process. The entries consist of buffer locator and buffer offset pairs which provide enough information for a storage interface request frame to be constructed from fragments in the copy buffer memory 2306. Data is read from copy buffer memory 2306, aligned as necessary and transferred into the storage interface board copy transmit FIFO 2316 via the storage interface board copy transmit control block 2311. When data is present in the copy transmit FIFO 2316, a request is made to the file system storage interface transmit process board to transmit a storage interface request. When data from buffers has been transferred into the copy transmit FIFO 2316, the buffers are freed back into the free buffers queue.

The file system copy buffer memory 2306 contains 65536 copy buffers. The copy control memory 2308 contains 65536 copy descriptors. Thus 128 Mbytes of data can be buffered here. The copy receive event queue 2310 and the copy transmit event queue 2314 can both contain 32768 entries. One incoming response will typically require two entries in the receive queue 2310, limiting the number of buffered requests to 16384. If the receive queue 2310 becomes full, no more incoming requests will be accepted from the storage interface board 2003. A storage interface request will typically require two entries in the transmit queue 2314, limiting the number of buffered requests to 16384. When the transmit queue 2314 becomes full, the host processor will stall filling the queue but will be able to continue with other actions.

In summary the limits are: 128 MBytes of data buffering, approximately queuing for 16384 incoming response and approximately queuing for 16384 requests. Data from the storage interface board 2003 is only accepted if there are resources within this section to store a maximum length frame of 128 KBytes. Thus when this buffer space is exhausted, or the receive queue 2310 becomes full, the storage interface board 2003 will be unable to forward its received frames.

Server Protocol and File System Software

Once a message has been wholly received by the file system board hardware, an event is sent to the CPU via an interrupt mechanism, as described elsewhere in this document. A BOSSOCK sockets layer will service the interrupt and read a connection identifier from the hardware buffer and queue the message against the appropriate connection, also calling the registered receiver function from that connection. Typically this receiver function will be the main message handler for the SMB, NFS or FTP protocol. The receiver function will read more of the incoming message from the hardware buffer to enable determination of the message type and the appropriate subsequent action as described below.

For illustration purposes, we will take the example of an SMB message being received, specifically an SMB WRITE command. This command takes the form of a fixed protocol header, followed by a variable command header, followed by the command payload, in this case the data to be written.

The receiver function for the SMB protocol first reads in the fixed protocol header from the hardware buffer, which is a fixed length at a fixed offset. Based on the contents of this protocol header, the command type and length can be determined. The relevant specialized command handler function is then invoked and passed the received command. This handler function will read in the variable command header associated with the command type, which in the case of a write operation will contain a file handle for the file to be written to, the offset within the file and the length of data to write. The file handle is resolved to an internal disk filing system representation.

This information is passed down to the disk filing system, along with the address of the hardware buffer that contains the data payload to be written to the file. The file system will update the metadata relating to the file being written to, within it's metadata cache in memory, then issue a disk WRITE command to the file system board hardware that contains the physical disk parameters where the new data should be written to and the location of the data payload in hardware buffer memory to write to disk. The payload data itself does not get manipulated by the CPU/software and at no point gets copied into CPU memory.

Once the file system responds having (at least) initiated the write to disk by sending the disk write command to the file system board hardware, the protocol handler function will queue the response packet to the client for transmission. At this point, the modified file metadata is in CPU memory, and what happens to it is determined by the metadata cache settings.

The metadata cache can be in one of two modes, write-back or write-through, with the default being write-back. In write-back mode, the updated metadata will remain in memory until one of two conditions is met: 1) the metadata cache logging timeout is reached or 2) the amount of modified metadata for a given volume exceeds a predetermined value (currently 16 MB). If the either of these conditions is met, an amount of modified metadata will be written to the file system board hardware for transmission to the disk, possibly using transaction logging if enabled.

In write-back mode, the metadata is not written all the way to the disk before the software continues, it is just written to the hardware buffers. There is recovery software that will enable the system to recover metadata that has been written to the hardware buffers if a crash occurs before the hardware has committed the metadata to the physical disk. This will obviously not happen if fail over is configured and the primary fails causing the standby unit to take control. In write-through mode, any metadata modified by an individual file system transaction will be written to the file system board hardware at the end of the transaction, again possibly using transaction logging if enabled, to be sent to the sector cache and thus to the disk as a "best effort". In either of these modes, the metadata written to the hardware by the file system is transmitted to the sector cache on the file system board and will be handled by that subsystem as defined by it's current caching mode (i.e., if the sector cache is in write-back mode, the metadata may be cached for up to the timeout period of the sector cache.

The Storage Interface Board

On the storage interface board 2003 all of the fibre channel management, device management and error recovery are handled by the storage system board processor. All disk and tape reads and writes are handled by the VLSI, unless there are any errors, in which case the processor gets involved.

The sector cache on the storage interface board 2003 is arranged as 32 Kbyte buffers, each of which can cache any 32 Kbyte block on any of the system drives attached to the storage system 2000. Each 32 Kbyte block is further subdivided into 32 1 Kbyte blocks, each of which may or may not contain valid data.

When a READ request is received from the file system board 2002, the VLSI first checks to see whether the 32 Kbyte buffers required for this transfer are mapped into the cache. If not, then buffers are taken from the free buffer queue and mapped to the required disk areas. If any of the 32 Kbyte buffers are mapped into the cache, the VLSI checks whether all of the 1 Kbyte blocks required for this transfer are valid in the cache buffers. Disk reads are then issued for any unmapped or invalid areas of the read request. Once all the data required for the read is valid in the cache, the VLSI then transmits the read data back to the file system board 2002.

When the cache is in write through mode, the VLSI first copies the write data from the file system board 2002 into buffers in the write memory. It then checks to see whether the 32 Kbyte buffers required for this transfer are mapped into the cache. If not, then buffers are taken from the free buffer queue and mapped to the required disk areas. If the start and/or end of the transfer are not on 1 Kbyte boundaries, and the start and/or end 1 Kbyte blocks are not valid in the cache, then the start and/or end blocks are read from the disk. The write data is then copied from the write memory to the appropriate place in the sector cache. Finally the 1 Kbyte blocks which have been modified ("dirty" buffers) are written to the disk.

When the cache is in write back mode, the process is identical to a write request mode in write through mode except that the data is not written back to the disk as soon as the write data has been copied into the cache. Instead the dirty buffers are retained in the sector cache until either the number of dirty 32 Kbyte buffers, or the time for which the oldest dirty buffer has been dirty, exceeds the user programmable thresholds. When this happens, the dirty data in the oldest dirty buffer is written to the appropriate disk.

On the storage interface board 2003, 2 Gbytes of sector cache memory are fitted. This is arranged as 65536 buffers, each of which can buffer up to 32 Kbytes of data. The write memory is 128 Mbytes in size, arranged as 4096 32 Kbyte buffers. If the write memory becomes full, or the sector cache becomes full of dirty data, the disk card will stop processing incoming requests from the SMB card until some more resources become available.

It should be noted that terms such as "client," "server," "switch," and "node" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A server for network-attached storage, the server comprising:
    a filesystem module configured to service a set of filesystem-related requests; and
    a processor programmed to run an operating system, a virtualization component, a native filesystem application, a virtualized third-party data processing application, and a filesystem module interface, wherein the virtualization component is programmed to intercept a predetermined set of filesystem-related system calls from the third-party data processing application and to direct servicing of such intercepted filesystem-related system calls by the filesystem module via the filesystem module interface, and wherein the virtualization component is configured to service at least one filesystem-related system call that is not supported by the operating system.

2. A server according to claim 1, wherein the filesystem module is implemented in hardware separate from the processor.

3. A server according to claim 2, wherein the filesystem module includes a set of registers through which the set of filesystem-related requests are provided to the filesystem module, and wherein the filesystem module interface provides access to the registers by other software components running on the processor.

4. A server according to claim 1, wherein the filesystem module interface is integral with the native filesystem application.

5. A server according to claim 1, wherein the filesystem module interface provides an application program interface through which the virtualization component interfaces with the filesystem module.

6. A server according to claim 1, wherein the virtualization component includes a driver that is integrated with the operating system.

7. A server according to claim 1, wherein the third-party data processing application is configured to run on a separate server and use network protocols to communicate with a filesystem over a network, and wherein the servicing of intercepted filesystem-related system calls bypasses operating system processes related to network protocol processing.

8. A server according to claim 1, wherein the third-party data processing application is configured to run on a separate server and use network protocols to communicate with a filesystem over a network, and wherein the virtualization component allows the third-party data processing application to run regardless of the status of the network.

9. A server according to claim 1, wherein the third-party data processing application is configured to mount a local filesystem volume as a remote volume, and wherein volume-related systems calls that are intercepted by the virtualization component bypass protocol processing that would normally be involved with directing the system calls to a remote volume.

10. A server according to claim 1, wherein the virtualization component is configured to direct at least one intercepted filesystem-related system call to the native filesystem application for processing, and wherein the native filesystem application selectively interfaces with the filesystem module via the filesystem module interface to satisfy the intercepted filesystem-related system call.

11. A server according to claim 1, further comprising a network interface module implemented in hardware separate from the processor and the filesystem module.

12. A server according to claim 1, wherein the third-party data processing application is configured to access the filesystem module directly via the filesystem module interface for at least one filesystem-related operation.

13. A server according to claim 12, wherein the at least one filesystem-related operation includes at least one of
    preloading directories;
    pre-fetching user data; and
    storing application-related information in the filesystem.

14. A server according to claim 13, wherein the filesystem module is configured to perform at least one filesystem module function based on application-related information stored in the filesystem by the third-party data processing application.

15. A server according to claim 1, wherein the third-party data processing application includes at least one of
    an archiving application;
    a deduplication application; and
    a file migration application.

16. A method for network-attached storage, the network-attached storage including a server having a filesystem module configured to service a set of filesystem-related requests and processor programmed to run an operating system, a virtualization component, a native filesystem application, a virtualized third-party data processing application, and a filesystem module interface, the method comprising:
    intercepting, by the virtualization component, a predetermined set of filesystem-related system calls from the third-party data processing application; and
    directing, by the virtualization component, servicing of such intercepted filesystem-related system calls by the filesystem module via the filesystem module interface, wherein the virtualization component is configured to service at least one filesystem-related system call that is not supported by the operating system.

17. A method according to claim 16, wherein the filesystem module is implemented in hardware separate from the processor.

18. A method according to claim 17, wherein the filesystem module includes a set of registers through which the set of filesystem-related requests are provided to the filesystem module, and wherein the filesystem module interface provides access to the registers by other software components running on the processor.

19. A method according to claim 16, wherein the filesystem module interface is integral with the native filesystem application.

20. A method according to claim 16, wherein the filesystem module interface provides an application program interface through which the virtualization component interfaces with the filesystem module.

21. A method according to claim 16, wherein the virtualization component includes a driver that is integrated with the operating system.

22. A method according to claim 16, wherein the third-party data processing application is configured to run on a separate server and use network protocols to communicate with a filesystem over a network, and wherein the servicing of intercepted filesystem-related system calls bypasses operating system processes related to network protocol processing.

23. A method according to claim 16, wherein the third-party data processing application is configured to run on a separate server and use network protocols to communicate with a filesystem over a network, and wherein the virtualization component allows the third-party data processing application to run regardless of the status of the network.

24. A method according to claim 16, wherein the third-party data processing application is configured to mount a local filesystem volume as a remote volume, and wherein volume-related systems calls that are intercepted by the virtualization component bypass protocol processing that would normally be involved with directing the system calls to a remote volume.

25. A method according to claim 16, wherein the virtualization component is configured to direct at least one intercepted filesystem-related system call to the native filesystem application for processing, and wherein the native filesystem application selectively interfaces with the filesystem module via the filesystem module interface to satisfy the intercepted filesystem-related system call.

26. A method according to claim 16, further comprising a network interface module implemented in hardware separate from the processor and the filesystem module.

27. A method according to claim 16, wherein the third-party data processing application is configured to access the filesystem module directly via the filesystem module interface for at least one filesystem-related operation.

28. A method according to claim 27, wherein the at least one filesystem-related operation includes at least one of
preloading directories;
pre-fetching user data; and
storing application-related information in the filesystem.

29. A method according to claim 28, wherein the filesystem module is configured to perform at least one filesystem module function based on application-related information stored in the filesystem by the third-party data processing application.

30. A method according to claim 16, wherein the third-party data processing application includes at least one of
an archiving application;
a deduplication application; and
a file migration application.

* * * * *